United States Patent
Kitada

(10) Patent No.: US 8,373,868 B2
(45) Date of Patent: Feb. 12, 2013

(54) SYSTEM AND METHOD TO ALLOW THE REMOVAL AND ADDITION OF FUNCTIONS ON A MULTI-FUNCTION PRINTER

(75) Inventor: Hiroshi Kitada, Tuckahoe, NY (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 1471 days.

(21) Appl. No.: 11/669,746

(22) Filed: Jan. 31, 2007

(65) Prior Publication Data

US 2008/0183754 A1 Jul. 31, 2008

(51) Int. Cl.
*G06F 3/12* (2006.01)
(52) U.S. Cl. .......................................... 358/1.13; 700/40
(58) Field of Classification Search .................... None
See application file for complete search history.

(56) References Cited

U.S. PATENT DOCUMENTS

| | | | |
|---|---|---|---|
| 6,990,434 B2 * | 1/2006 | Minogue et al. | 702/188 |
| 2004/0223182 A1 * | 11/2004 | Minagawa | 358/1.15 |
| 2005/0149712 A1 * | 7/2005 | Martinez et al. | 713/1 |
| 2006/0212629 A1 * | 9/2006 | Suzuki et al. | 710/104 |

OTHER PUBLICATIONS

U.S. Appl. No. 11/562,668, filed Nov. 22, 2006, Tang et al.

\* cited by examiner

*Primary Examiner* — Twyler Haskins
*Assistant Examiner* — Lennin Rodriguez
(74) *Attorney, Agent, or Firm* — Oblon, Spivak, McClelland, Maier & Neustadt, L.L.P.

(57) ABSTRACT

A method and device for invoking a set of services corresponding to a plug-in application installed on an image handling device. The method including launching a host application of an image handling device, accessing a configuration file of the image handling device, launching the at least one plug-in based on the information regarding the activation of each service and presenting a graphical interface that includes a graphical indicia of each activated service corresponding to each activated plug-in.

23 Claims, 27 Drawing Sheets

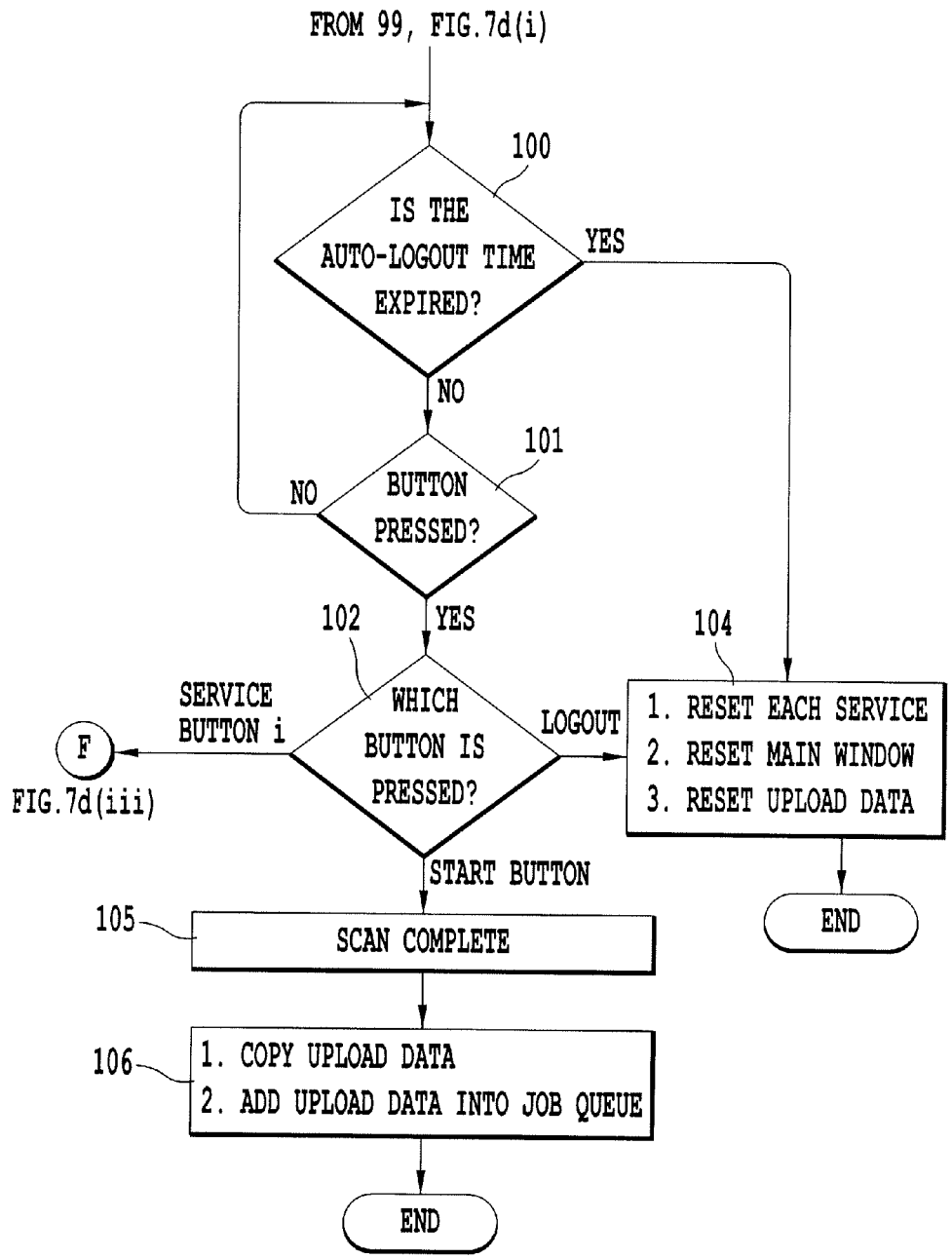
Fig. 7d(ii)

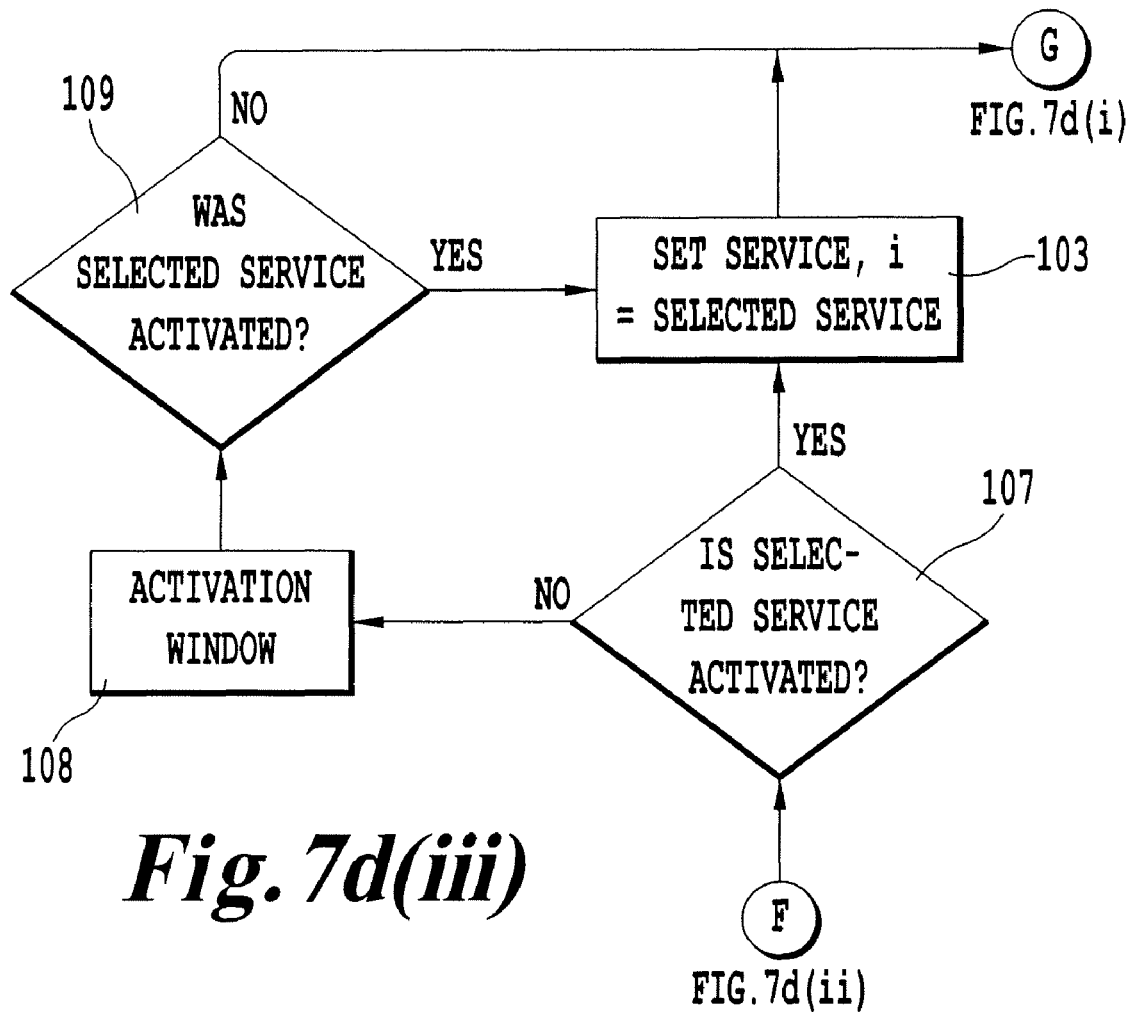
*Fig. 7d(iii)*

```
 1  <MFP>
 2      <MFPSerialNo>ABC112223333</MFPSerialNo>
 3      <MACAddress>11-22-33-44-55-66</MACAddress>
 4      <AccountName>Ricoh</AccountName>
 5      <UserName>Ricoh User</UserName>
 6  </MFP>
 7  <Service>
 8      <ServiceName>DMEmail</ServiceName>
 9      <DisplayName>Document Mall Email</DiplayName>
10      <Activation>
11          <ActivationRequired>Y</ActivationRequired>
12          <Activated>Y</Activated>
13          <ActivationDate>1-22-07</ActivationDate>
14          <ExpirationDate>4-22-07</ExpirationDate>
15      </Activation>
16      <ServiceWindowClass>
17          com.ricoh.UnifiedClient.DocumentMall.DMEmailWindow
18          .class
19      </ServiceWindowClass>
20      <DataHandlerClass>
21          com.ricoh.UnifiedClient.DocumentMall.DMServiceDataH
22          andler.class
23      </DataHandlerClass>
24      <ConfigurationData>
25          <DMServer>documentmall.com</DMServer>
26      </ConfigurationData>
27      <DataHandlerConfigurationData>optional</DataHandlerConfi
28  gurationData>
29  </Service>
30  <Service>
31      <ServiceName>eCabinetFolder</ServiceName>
32      <DisplayName>eCabinet Scan to Folder</DiplayName>
33      <Activation>
34          <ActivationRequired>N</ActivationRequired>
35          <Activated>Y</Activated>
36          <ActivationDate>1-22-07</ActivationDate>
37          <ExpirationDate></ExpirationDate>
```

*Fig.11a*

```
1   </Activation>
2   <ServiceWindowClass>
3       com.ricoh.UnifiedClient.eCabinet.eCabinetWindow.class
4   </ServiceWindowClass>
5   <DataHandlerClass>
6       com.ricoh.UnifiedClient.eCabinet.eCabinetServiceData
7       Handler.class
8   </DataHandlerClass>
9   <ConfigurationData>
10      <eCabinetServer>eCabinet.com</eCabinetServer>
11  </ConfigurationData>
12  <DataHandlerConfigurationData>optional</DataHandlerConfi
13 gurationData>
14 </Service>
```

*Fig. 11b*

SYSTEM AND METHOD TO ALLOW THE REMOVAL AND ADDITION OF FUNCTIONS ON A MULTI-FUNCTION PRINTER

BACKGROUND OF THE INVENTIONS

The present invention relates to a system and method to allow the removal and addition of functions on a multi-function printer.

Conventionally, when a user wanted to install a new service on a multi-function printer ("MFP") such as a file storage application 2/3, a new application 4 had to be installed to the MFP that made these services available, as shown in FIG. 1. FIG. 22 illustrates an example of a conventional multi-function printer 800 with an application layer 802 having applications 801a, 801b, and 801c, an OS 803 and hardware 804.

In order to leverage these applications in an MFP context, the applications are installed by a service person that would travel to the physical site of the multi-function printer and install the applications manually. In addition if a user or a retailer wanted to remove an application from the MFP a service person was required to visit the physical site of the MFP and physically uninstall the application.

SUMMARY OF THE INVENTIONS

The present inventions provide, inter alia, a method that includes launching a host application of an image handling device. The image handling device includes at least one plug-in and a corresponding set of services. The method further includes accessing a configuration file of the image handling device. The configuration file includes information regarding the activation status of each service corresponding to the at least one plug-in. Also included in the method is launching the at least one plug-in based on the information regarding the activation of each service. The plug-in provides the corresponding set of activated services to the host application. The method includes presenting a graphical interface that includes a graphical indicia of each activated service corresponding to each activated plug-in.

Also included in the present invention is a method that includes launching a host application on an image handling device. The image handling device includes an application layer, hardware and an operating system. The method also includes launching an activation manager. The activation manager determines which installed plug-ins and which services corresponding to the installed plug-ins to activate. The method includes reading a configuration file stored on the image handling device. The configuration file includes information identifying the image handling device, the user of the image handing device and the services corresponding to the installed plug-ins. The method includes determining the activation status of each service in the configuration file and updating the configuration file based on the determining. The configuration file is updated to include information regarding the activation status of each service. The method also includes generating a project array based on the number of installed plug-ins, generating a service array for each project and displaying a project array window. The project array window graphically displays each project included in the project array. The method includes determining the activation status of each project selected by a user and each corresponding service and displaying a main window and a default service window when a project is selected in the project array window and is determined to be active. The main window includes graphical indicia of the activated project services.

Also included in the present invention is an image handling device which includes a host application configured to provide the core service of the image handling device, a plug-in application configured to be programmatically invoked by the host application, an activation manager configured to control access to the plug-in application and a configuration file updated by the activation manager stored in a memory and including information regarding activation of the plug-in application and functions corresponding to the plug-in application, the host application configured to programmatically invoke the plug-in in accordance with information regarding activation in the configuration file.

It is to be understood that both the foregoing general description of the invention and the following detailed description are exemplary, but are not restrictive, of the invention.

BRIEF DESCRIPTION OF SEVERAL VIEWS OF THE DRAWINGS

Other objects, features and advantages of the present invention will become more apparent from the following detailed description when read in conjunction with the accompanying drawings, in which:

FIGS. 11A-11B show an example of a config.xml file;

DETAILED DESCRIPTION OF THE INVENTIONS

The present advancements relate, in part, to a method of executing applications installed on an image handling device. The image handling device is a MFP. The MFP is any printer or copier which includes multiple functions such as scanning, printing and/or faxing. Additionally, the MFP described above may include a copier that scans and prints a document in a single step as scanning and printing are distinct functions.

The present advancements also are related to a host application of the image handling device and a configuration file of the image handling device. The host application may be executable code that interfaces with the operating system of the MFP and accesses the hardware of the MFP through the operating system.

The configuration file includes activation information corresponding to at least one plug-in and a set of services corresponding to the at least one plug-in. In other words, the configuration file includes the information that determines which plug-in can be run by on the MFP. Even if the physical application is found on a memory or hard drive of the MFP, unless the configuration file allows activation, the application will not be executed.

The configuration file may be any type of configuration file including an extensible markup language such as XML, Standard Generalized Markup Language (SGML), GML, RDF/XML, RSS, Atom, MathML, XHTML, SVG, DSDL, XUL, MXML, EAD or Klip.

It should also be noted that the configuration file is able to be used in a mixed brand environment. Even if, for example, several different brands of copiers are used in an environment such as an office or a building, each unique brand will be able utilize the configuration file. In addition each different MFP may be able to load the unified client architecture and the plug-ins. Thus, each copier or multi-function device will be able to have the same basic interface and commands limited only be the functionality of the specific copier or multi-function printer in question.

The present advancements also are related to launching at least one plug-in based on the activation information in the configuration file. Each plug-in includes a number of services that increase the functionality of the MFP.

The method also includes presenting a graphical interface that includes a graphical indicia of each activated plug-in and each activated service of the set of services corresponding to the activated plug-in. The graphical indicia can be links or pages relating to the activated plug-ins and corresponding activated services. Examples of the graphical interface are discussed with reference to FIGS. 12-19 below.

Figure 1:
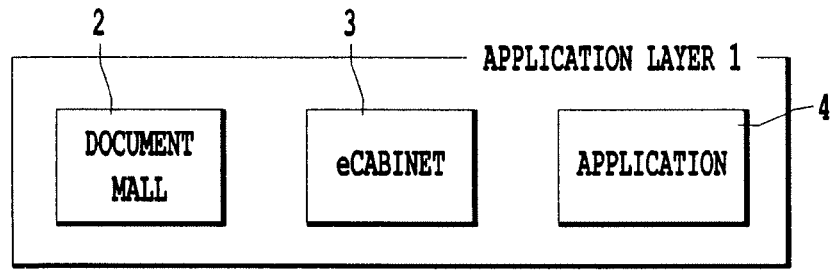
FIG. 1 is a block diagram showing a typical application layer included on a conventional MFP.
Figure 2:
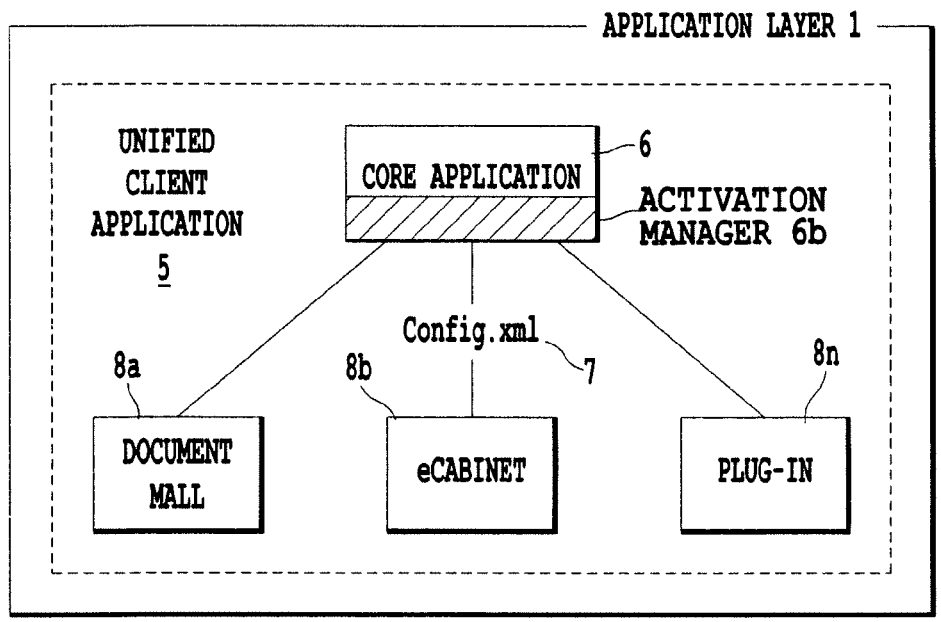
FIG. 2 is a block diagram of an application layer of an MFP according to an exemplary embodiment of the present invention.

Referring now to the drawings wherein like reference numbers designate identical or corresponding parts throughout the several views and more particularly to FIG. 2 thereof, there is illustrated an application layer 1 including a unified client application 5. The unified client application 5 installed on a MFP includes a core application 6, the core application being an application that includes primary routines that serve the application. These primary routines typically carry out basic functions of the MFP including scanning, printing, copying, faxing, and communicating, for example. Included below the core application 6 is the activation manager 6b. The activation manager is the portion of the unified client application that determines the activation status of plug-ins and corresponding services. In addition, the activation manager 6b generates a config.xml file 7 based on the determination of the activation status.

The activation manager 6b provides the ability to activate or de-activate any plug-in installed on the MFP. Thus, all available functionalities can be pre-installed on the MFP at the factory. When a user takes delivery of the MFP, the MFP may have some of the plug-ins activated or none of the plug-ins activated. If none of the plug-ins are activated, the user can activate the plug-ins as the user sees fit, such as when the need arises.

Different types of activation schemes are also available. For example, the user may be able to activate a plug-in for a limited time on a trial basis. Alternatively, the user may be able to buy, lease, or license the use of the plug-in for a one time use or a time-based use such as for a week or a month. This could be useful for organizations that have higher demand during certain times of the year such as during tax season.

Additionally, the activation manager enables different fee schemes to be used on the MFP. For example, a user may pay a monthly subscription fee for use of a plug-in. When the user no longer needs the plug-in, the use can be discontinued via a central server using the activation manager 6b. Additionally, plug-ins can be de-activated based on expiration dates. For example, a user could buy a six month subscription to a plug-in, once the six months have expired the plug-in can be deactivated.

Further, if the user has the ability to activate plug-ins (such as the user has financial decision making abilities) the activation manager 6b enables the user to activate plug-ins in different ways. For example, using a device attached to the MFP, a users ability to buy activation could be verified. Devices such as a smart card, biometrics, PIN code, magnetic strip card or proximity card could be used as well as other existing ID verification systems to enable the purchase/activation.

With respect to the activation, in the event that a user has control over a number of MFPs, the activation process can be accomplished remotely and collectively. Thus, a large number of MFPs can have plug-ins activated virtually simultaneously using a remote station. This enables uniformity in an organization and also saves a significant amount of time as there is no need to visit each MFP to perform an activation or deactivation.

The config.xml file 7 includes settings regarding unified client application 5 in addition to activation information. Additionally, plug-ins 8a . . . n are controlled by the core application 6.

Different types of plug-ins can be installed in the unified client application 6. For example, in the present example depicted in FIG. 2, a Document Mall plug-in 8a, an eCabinet plug-in 8b and a generic plug-in 8n are installed.

A plug-in generally includes programs or code for operating the hardware of the multi-function printer via the core application 6. An alternate illustration of the Unified Client application 5 shown in FIG. 2 is set forth in FIG. 3 which includes the core application 6, the activation manager 6b which is separate from the core application, the config.xml file 7 including activation information and the plug-ins 8, the plug-ins including an activation reading part 8b.

Figure 4:
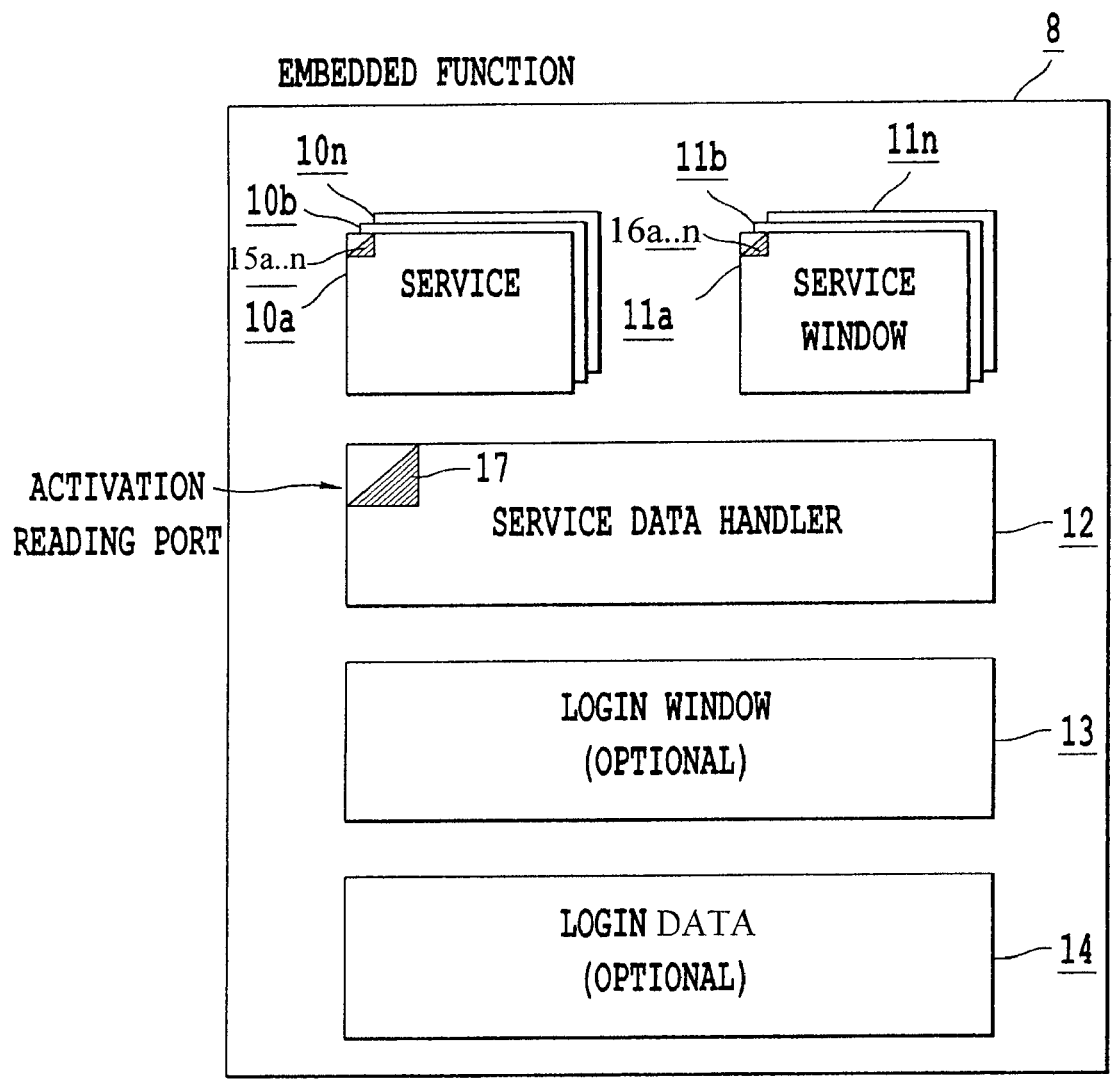
FIG. 4 is a block diagram showing a plug-in according to an exemplary embodiment of the present invention.

FIG. 4 shows an example of an internal structure of a plug-in 8. For example, the plug-in 8 may include a single service window 10a or may also include a number of service windows such as 10a . . . 10n. The service window 10a . . . n is a user interface that enables the user to interface with the service that corresponds to the service window 10a . . . n. The service window 10a . . . n also includes an activation reading part 15a . . . n. The activation reading part 15a . . . n is the first function performed when a service window 10a . . . n is executed and checks to see if the service window is active before any other functions are performed. Further explanation of the service window 10a . . . n will be discussed below with respect to FIGS. 12-16. The plug-in 8 may also include a single service data 11a or a number of service data elements 11a . . . n. The service data elements 11a . . . n also include an activation reading part 16a . . . n. As noted above with regard to the service window activation reading part 15a . . . n, the activation reading part 15a . . . n ensures that the service data elements are activated. Each service window 10a . . . n has corresponding service data 11a . . . n. In addition, the activation reading part of the service window 15a . . . n corresponds to the activation reading part 16a . . . n of the service data 11a . . . n. The service data 11a . . . n generally includes service name, service id, configuration data corresponding to the service window 10a . . . n, default service window data and run time data entered by users through service window 10a . . . n.

The plug-in 8 also includes a service data handler 12 and optionally may include a login window 13 and login data 14, in other words, an authentication user interface. The service data handler 12 is the portion of the unified client application that uploads data from the MFP to a receiving device. Included in the service data handler 12 is a activation reading part 17. The activation reading part 17 checks the activation information in the config.xml 7 file to ensure that the service data handler 12 is activated before any corresponding functions of the service data handler 12 are preformed. In each plug-in 8, there may be multiple service windows 10a . . . n and service data elements 11a . . . n. However, according to one preferred embodiment, there is only one service data handler 12. Other embodiments may have more than one service data handler 12.

Figure 5:
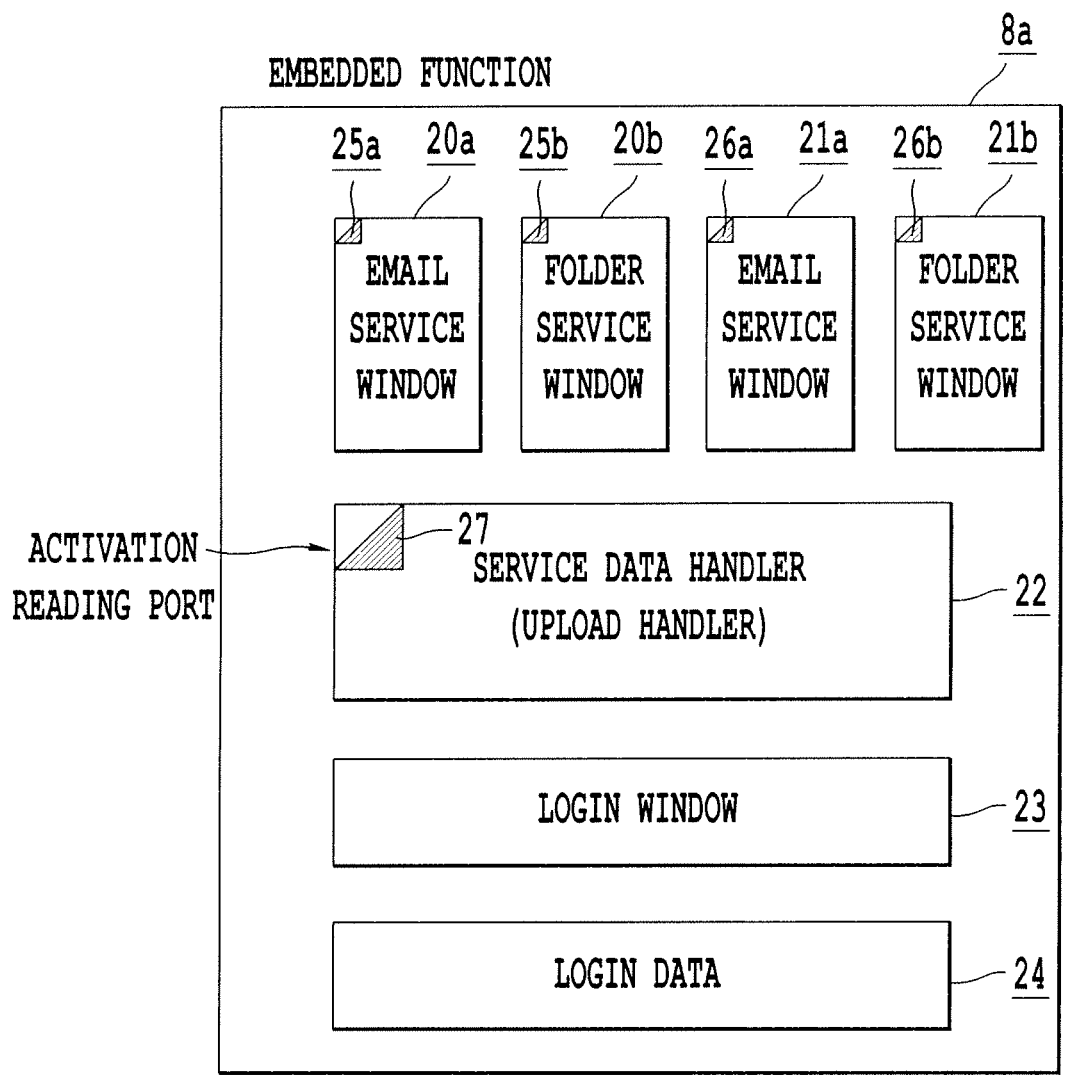
FIG. 5 is a block diagram showing an example of a plug-in for a Document Mall application.

FIG. 5 depicts an example of the Document Mall plug-in 8a. The Document Mall service can be installed on the core application 6 as a plug-in 8. When the Document Mall plug-in 8a is installed in the unified client application 5, the services provided by Document Mall are extended to the MFP in which the unified client application 5 is installed. The Document Mall plug-in 8a preferably includes the optional login window 23 and login data 24. These options allow user names, passwords and accounts to be input and utilized by the plug-in 8a, allowing the plug-in 8a to restrict unauthorized users from use of the plug-in 8a.

The Document Mall plug-in 8a further includes several different service windows and service data. For example, in the Document Mall plug-in 8a, an e-mail service window 20a and a folder service window 20b are included. The email service window 20a is a user interface enabling a user to enter a Document Mall stored email address as a scan destination, while the folder service window 20b is a user interface that enables a user to select a Document Mall folder as the scan destination. Further, an e-mail service data 21a and folder service data 21b are also included. The e-mail service data 21a and the folder service data 21b correspond to the data generated by the e-mail service window 20a and the folder service window 20b, respectively. Both the service windows 20a and 20b and the service data elements 21a and 21b include activation reading parts 25a . . . b and 26a . . . b. The activation reading parts are the first functions performed by the service window/data element pairs and are used to ensure that the corresponding service window/data is activated and able to perform a function. The Document Mall plug-in 8b also includes a service data handler 22. In the example of the Document Mall plug-in 8a the service data handler 22 is used as an upload handler that merges both the e-mail service data 21a and the folder service data 21b into one upload.xml file, and sends the upload file to a Document Mall server through an https post command, for example. Other uses for the service data handler 22 not mentioned in this example are also possible. The service data handler 22 also includes an activation reading part 27. The activation reading part 27 allows the service data handler 22 to ensure activation before performing any functions.

Figure 3:
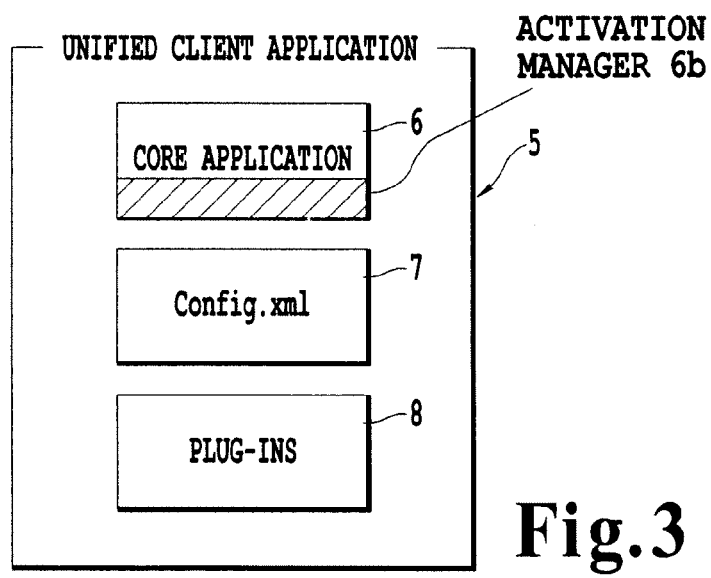
FIG. 3 is a block diagram showing a Unified Client Application according to an embodiment of the present invention.
Figure 6A:
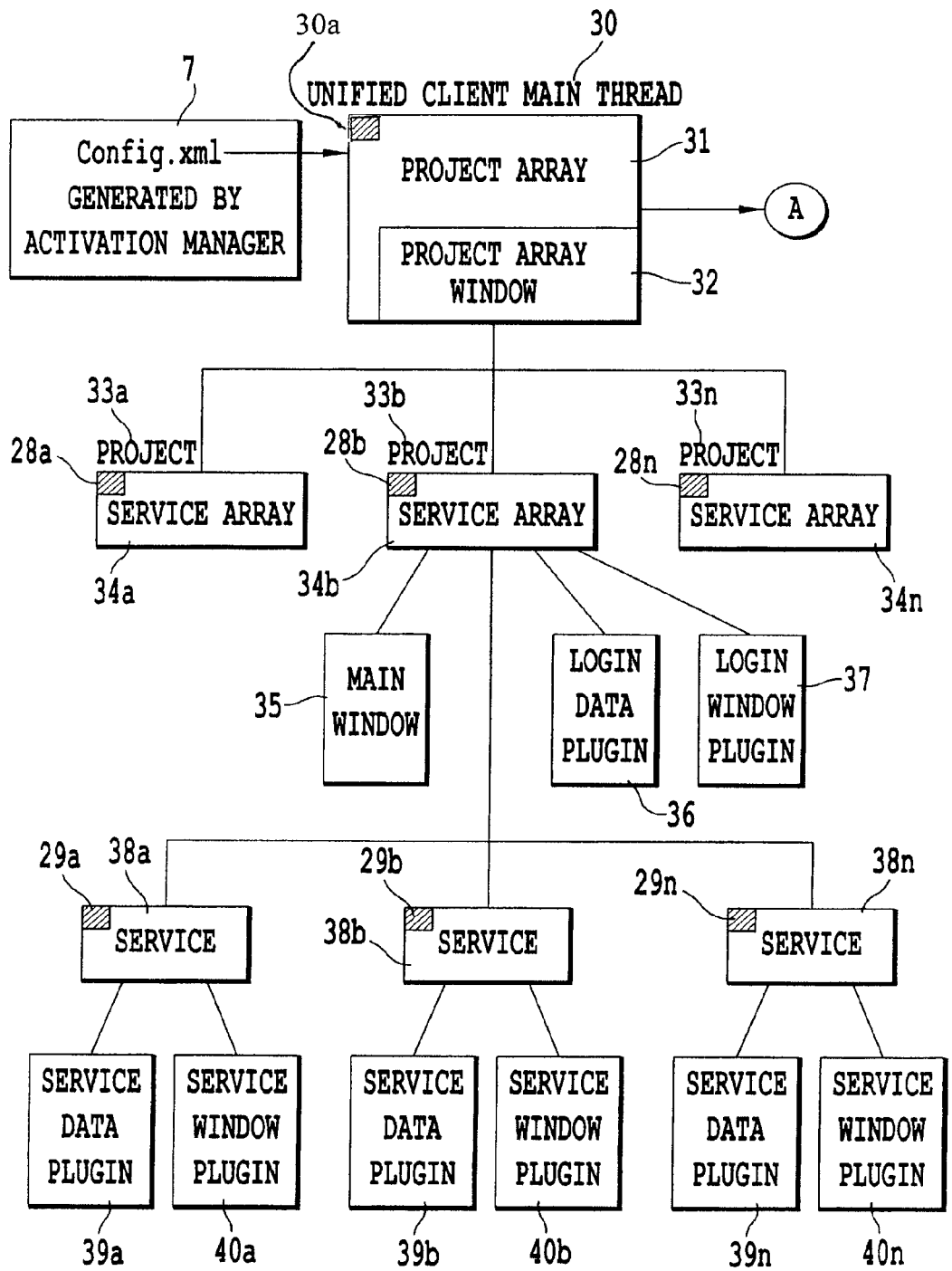
FIGS. 6A and 6B are process diagrams showing exemplary software architecture.

FIG. 6a shows the unified client software architecture structure. The unified client application 5, shown in FIGS. 2 and 3, is launched by a unified client main thread 30. In FIG. 6a, the unified client main thread 30 is shown as including an activation reading part 30a, a project array 31 and a project array window 32. The main thread 30 initializes the core application 6 and uses the activation reading part 30a to read the config.xml file 7 in order to create the project array 31 based on the activation information found in the config.xml file 7. The config.xml file 7 includes activation information regarding several projects 33a . . . n, each project 33a . . . n corresponding to at least one activated plug-in 8.

The project array 31 is a list of projects that are found to be active in the unified client application. The project array 31 is constructed by reading <project> tags and activation information included in the config.xml file 7. Further, the main thread 30 creates service arrays 34a . . . n for each project 33a . . . n by reading <service> tags and activation information included in the config.xml file 7. The service array is a list of the activated services installed under a respective project. The main thread 30 also displays the project array window 32. The project array window 32 is the first screen displayed when using or executing the unified client application 6. However, according to one embodiment of the invention, if only one project 33b is installed on the system, the project array window 32 will be bypassed. The project array window 32 displays project buttons for the user to select. When a project button is selected, the corresponding project 33a . . . n is invoked. It should also be noted that the project array window 32 may or may not display un-activated projects depending on the activation information found in the config.xml file 7. For example, in one configuration if a plug-in 8 is not found to be activated by the main thread 30 a project 33a . . . n may not be created for the plug-in 8 making it seem to the user as if the plug-in 8 does not physically exist on the MFP. In contrast, in another configuration if a plug-in 8 is not found to be activated the main thread 30 may create a project 33a . . . n corresponding to the plug-in 8. However, when the user attempts to execute the project 33a . . . n via the project array window 32 instead of loading the corresponding main window 35 the project 33a . . . n will give the user the ability to activate the project 33a . . . n. Additionally, the project 33a . . . n may give the user the ability to see a demonstration of the project 33a . . . n or use the project for a limited time. A more detailed discussion of the activation process can be found below with reference to FIG. 7E. The project array window 32 will be discussed in further detail below with respect to FIG. 9.

Several projects 33a . . . n are shown in FIG. 6a connected to the project array 31. Each project 33a . . . n includes an activation reading part 28a . . . 28n. The activation reading part 28a . . . 28n determines how the project 33a . . . n will be executed and which services 38a . . . n are included in a service array 34a . . . n. Each project 33a . . . n can manage a login/logout process of the project 33a . . . n through a corresponding login data plug-in 36 and login window plug-in 37. For example, if authentication is needed in the project 33a . . . n, a login window plug-in 37 can be used to display a login window which will be displayed before the user can begin accessing the project 33a . . . n. Once the login/logout button is pressed, a corresponding login and logout handler used by login data plug-in 36 will be called.

Further, the project 33a . . . n can control the post login process. For example, each service 38a . . . n can define its own post login process for its service window displayed by the service window plug-in 40a . . . n. When the authentication succeeds, the post login process of each service 38a . . . n will be called sequentially.

The login window displayed by the login window plug-in 37 described above, is an example of an authentication user interface ("UI") display. The login window, displayed by the login window plug-in 37, interfaces with the login data which is included in the login data plug-in 36 and includes an authentication process definition. Additionally, the login window used by the login window plug-in 37 can be implemented to request additional authentication information. As one example, for the Document Mall plug-in 8a, the Document Mall login window 23 may be implemented to include a place for users to enter account information. Other information may be utilized by the login window plug-in 37. Additionally, the login data can be accessed by each service window 40a . . . n and service data handler 12. Further, each project 33a . . . n includes a main window 35 and a service array 34a . . . n.

In FIG. 6a, a main window 35 is associated with the project 33b. Although the main window 35 is only illustrated under project 33b, each project 33a . . . n may be implemented to include a main window. The main window 35 is used for service management for each service 38a . . . n which corresponds to a button, the button being a user selectable link to a service window, included in the main window 35. For example, in the Document Mall plug-in 8a example, the main window 35 includes buttons for scanned setting handling, document name input and login button handling. Another example of the main window 35 is discussed below with respect to FIG. 10.

Included in each project 33a . . . n is a service array 34a . . . n. Each service array 34a . . . n includes a list of the activated services 38a . . . n. A service 38a . . . n is a function relating to an installed plug-in. Each service 38a . . . n includes an activation reading part 29a . . . n, a service window plug-in 40a . . . n and a service data plug-in 39a . . . n. The activation reading part 29a . . . n is the first function activated by a service 38a . . . n and determines if the service is activated. A service window included in the service window plug-in 40a . . . n displays a service window user interface. Further, the service window plug-in 40a . . . n performs the post-login process or gets and sets default values in the service data plug-in 39a . . . n. For example, in the post-login process of the Document Mall plug-in 8a example, a Document Mall folder service downloads the user's folder list and sets the user's folder as the default folder destination. The service window plug-in 40a . . . n also performs interactive operations with the user to interact and update the service data in the service data plug-in 39a . . . n. The service window plug-in 40a . . . n is an abstract class and, as such, certain behaviors of the service window plug-in 40a . . . n are predefined in the code. However, a developer is able add features to, or extend the service window plug-in depending on the needs of the developer. For example, in the Document Mall plug-in 8a example, a Document Mall e-mail service window supports both e-mail address search using the Document Mall service, and manual e-mail address entry.

The service data included in the service data plug-in 39a . . . n is updated by the service window plug-in 40a . . . n based on user operations. Further, the service data included in the service data plug-in 39a . . . n is accessed by an activated service data handler 12 when upload operations are performed. For example, if activated, the sending of e-mails or uploading to network folders may be performed by the service data handler 12 as is done in the Document Mall plug-in example 8a. As with the service window plug-in 40a . . . n, the service data plug-in 39a . . . n is an abstract class which can be updated or extended by plug-in developers to create further service related data. For example, in the Document Mall plug-in 8a example, the Document Mall e-mail service sends an e-mail based on the e-mail destination address that is saved in the service data included in the service data plug-in 39a . . . n.

Thus, the unified client main thread 30 includes a project array 31 which lists several projects 33a . . . n which may or may not be activated, each activated project including the service array 34a . . . n which lists several services 38a . . . n which may or may not be activated. As discussed above different embodiments of the present invention handle the inclusion of activated and non-activated projects and services in the corresponding project or service array. In one embodiment, only activated projects and services are included in the corresponding project and service arrays. In another embodiment the un-activated projects and services are included in the corresponding project and service arrays, when a user attempts to utilize the functionality of the inactivated projects and services the user is given the ability to buy or activate the service. Further detail regarding this feature will be discussed below with regard to the activation manager. The projects 33a . . . n found in the project array are displayed on a project array window 32 and each project includes a main window 35, and optionally a login window which is displayed before the main window 35, the login window could alternatively be displayed simultaneously with the main window 35. Further, each service 38a . . . n includes a service window included in the service window plug-in 40a . . . n.

It should also be noted that multiple plug-ins 8 can be associated with a single project 33a . . . n. For example, if the Document Mall plug-in 8a and eCabinet plug-in 8b are included in a single project 33a . . . n, users will see both Document Mall and eCabinet service windows 40a . . . n in main window 35. If a user enters all necessary information in corresponding service windows 40a . . . n, one scan job can be delivered to both the Document Mall and eCabinet servers. In the case that multiple plug-ins 8 are associated with one project each unique function corresponding to the plug-in has its own activation reading part. For example, if only the Document Mall function is activated the eCabinet functions would either not be available or would need to be activated before use.

Figure 6B:
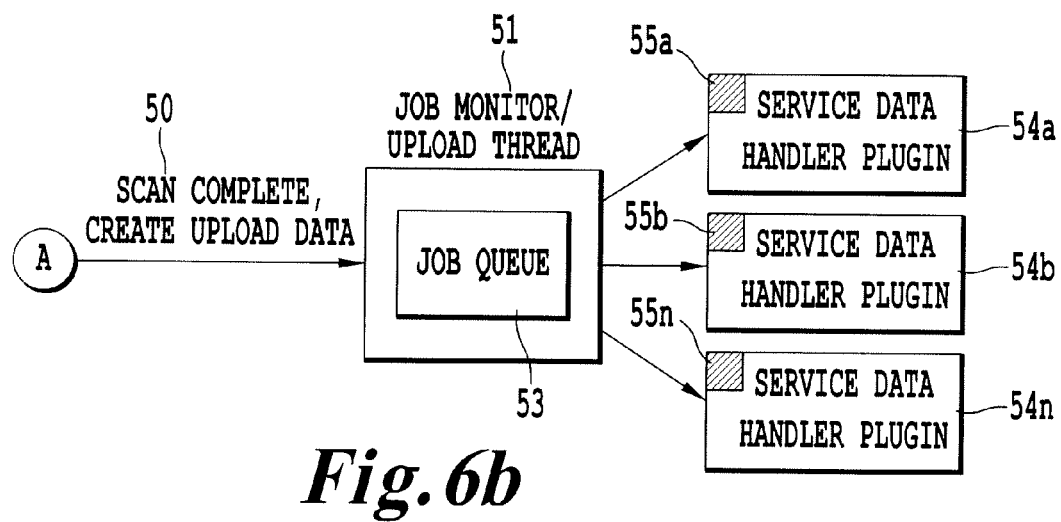

Turning now to FIG. 6b, this figure connects to FIG. 6a by symbol connector A. Once a scan by the MFP is completed, upload data 50 is created. The upload data 50 includes a document name, scan data, login data and service data, for example. The upload data 50 can also include any other information that can be uploaded by a service data handler 54a . . . n to a reception device. The service data handler 54a . . . n includes an activation reading part 55a . . . n and performs upload of data from the MFP, each service data handler being related to a project 33a . . . n. An upload thread/job monitor 51 includes a job queue 53. The upload thread/job monitor 51 is a background process that monitors the job queue 53 and processes the jobs when they become available. The upload thread/job monitor 51 is connected to the service data handler 54*a* . . . *n*. When a scan completes, the main thread 30 posts its final upload data 50 and adds it to the job queue 53.

For each job, the upload thread/job monitor 51 groups upload data 50 based on the corresponding service data handler 54*a* . . . *n* and invokes the corresponding service data handler plug-in 54*a* . . . *n* to process the upload data 50. For example, in the Document Mall plug-in 8*a* example, the upload thread/job monitor 51 passes generic data such as scan or image file related information, login data e-mail service data and folder service data to the Document Mall service data handler plug-in 54*a* . . . *n* to be processed. Once the upload thread/job monitor 51 has completed the above steps, the final steps are to get a job upload status and update a job log. The job upload status is the status of the upload by the service data handler 54*a* . . . *n* and the job log is the list of jobs processed by the upload thread/job monitor 51.

As described above, the service data handler 54*a* . . . *n* performs the upload of the upload data 50. However, the service data handler 54*a* . . . *n* will only perform its function if activation is first confirmed by the activation reading part 55*a* . . . *n*. For example, in the Document Mall plug-in 8*a* example, the activation reading part 55*a* . . . *n* will access the config.xml 7 to confirm that the service data handler 54*a* . . . *n* is activated. If activation is confirmed, then the service data handler 54*a* . . . *n* receives generic data, login data e-mail service data such as e-mail destinations and folder service data such as folder destinations. Finally the service data handler 54*a* . . . *n* composes the received upload data 50 into an upload.xml file and uploads the xml file to a Document Mall server designated in the config.xml file 7 via a http post process. Finally the service data handler 54*a* . . . *n* reports the upload status to the job monitor for job logging.

Any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

FIGS. 7A-7E show a flowchart of the unified client main thread 30. After starting in FIG. 7A, the unified client application 5 is initialized in step 60. The unified client application 5 is initialized by first initializing the core application 6. Next in step 61, the activation manager 6*b* determines activation status of each plug-in and corresponding service found in the config.xml file located on the MFP, further detail is found in FIG. 7E. In step 62, the flow determines if at least one plug-in 8 is activated.

If no plug-in is activated the flow proceeds to an activation window 68. The activation screen enables the user of the MFP to activate, through purchase or trial, at least one plug-in on the MFP. Once a user has activated at least one plug-in the flow would return to step 61 where the activation manager would determine if at least one plug-in 8 is activated.

If it is determined that at least one plug-in is activated, the flow moves onto step 64 where the config.xml file 7 is read. The config.xml file 7 includes settings for the core application 6 and for the plug-ins 8 which are associated with the host or core application 6. A project array 31 is then constructed in step 65 based on the number of installed plug-ins 8. Next in step 66, the service array 34*a* . . . *n* is constructed for each activated project 33*a* . . . *n*. Further a main window 35 is constructed in step 67. As noted earlier, FIG. 10, discussed in more detail below, shows an example of the main window 35. Flow then proceeds to process B in FIG. 7B.

Figure 7A:
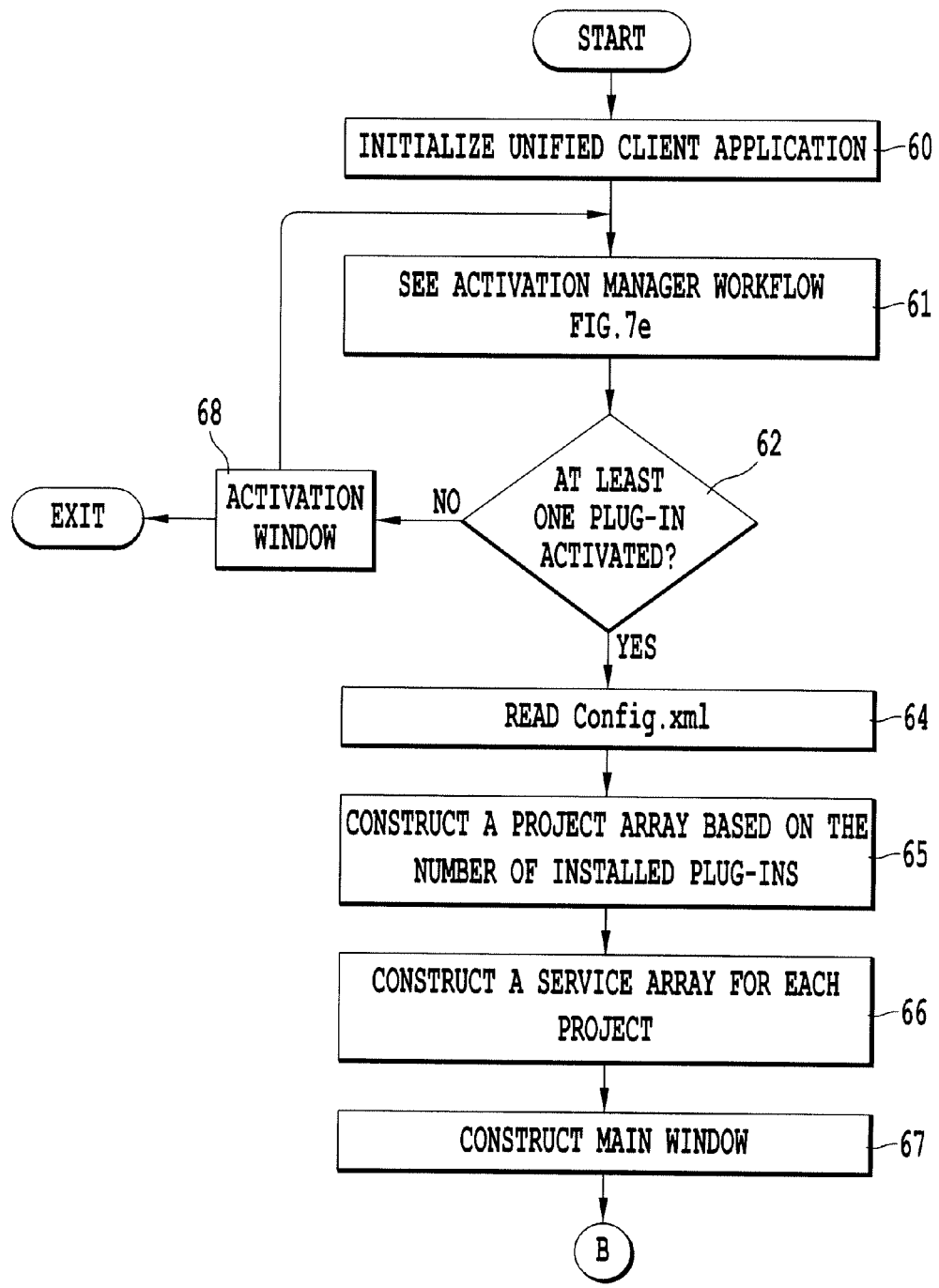
FIGS. 7A, 7B, 7C, 7D and 7E are flowcharts showing a procedure of the process of the Unified Client Main thread.
Figure 7B:
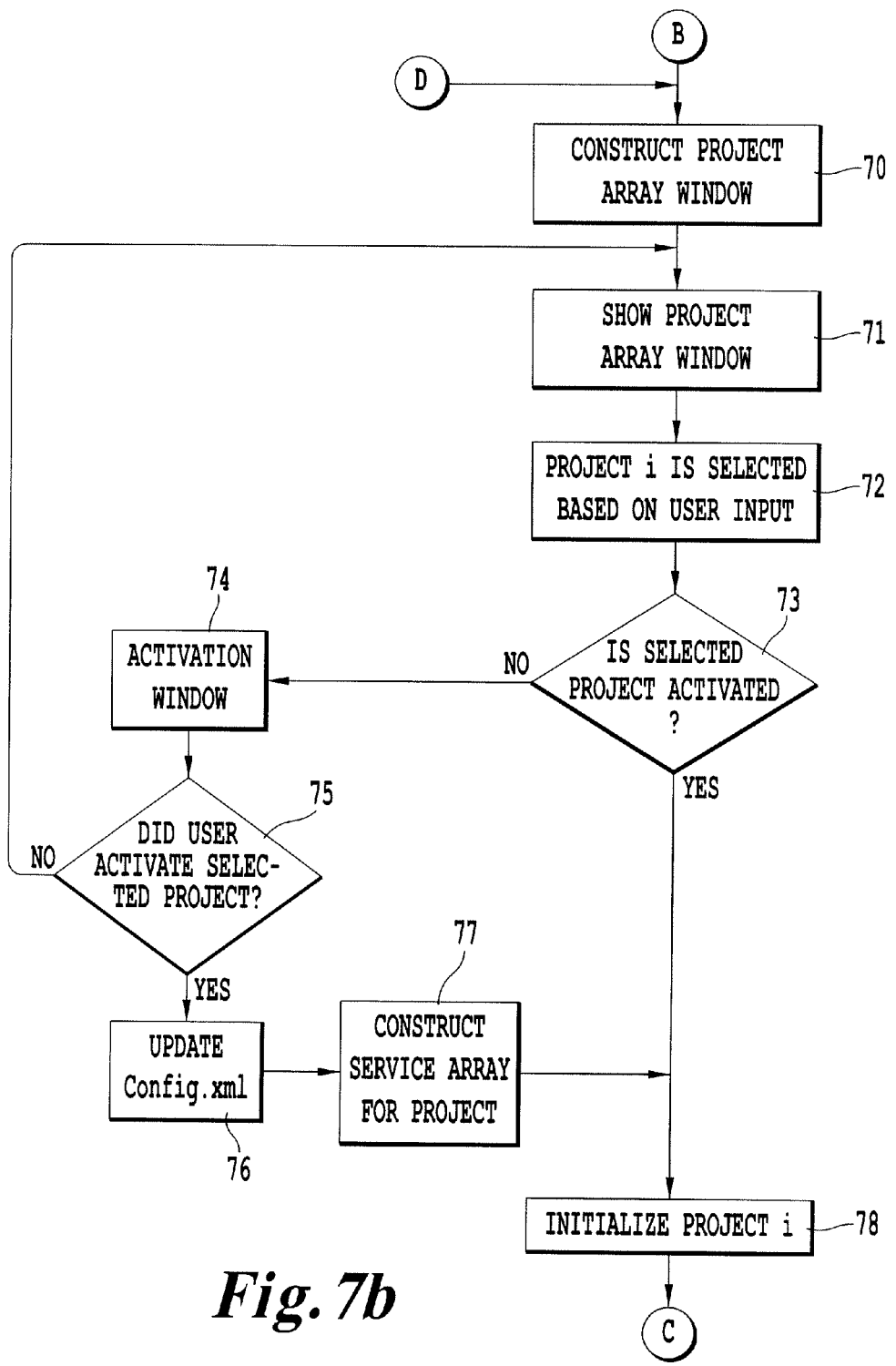
Figure 7C:
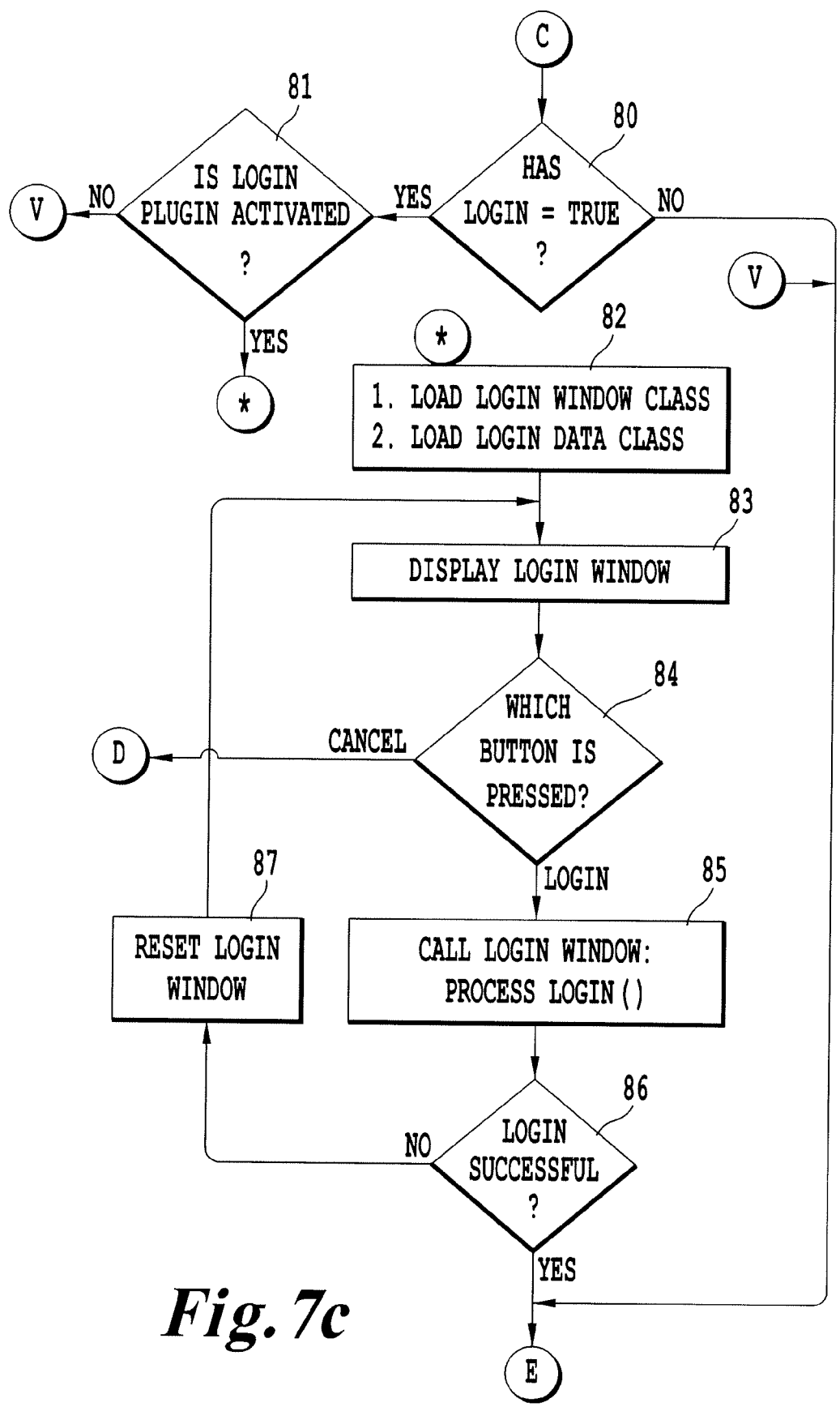
Figure 7D:
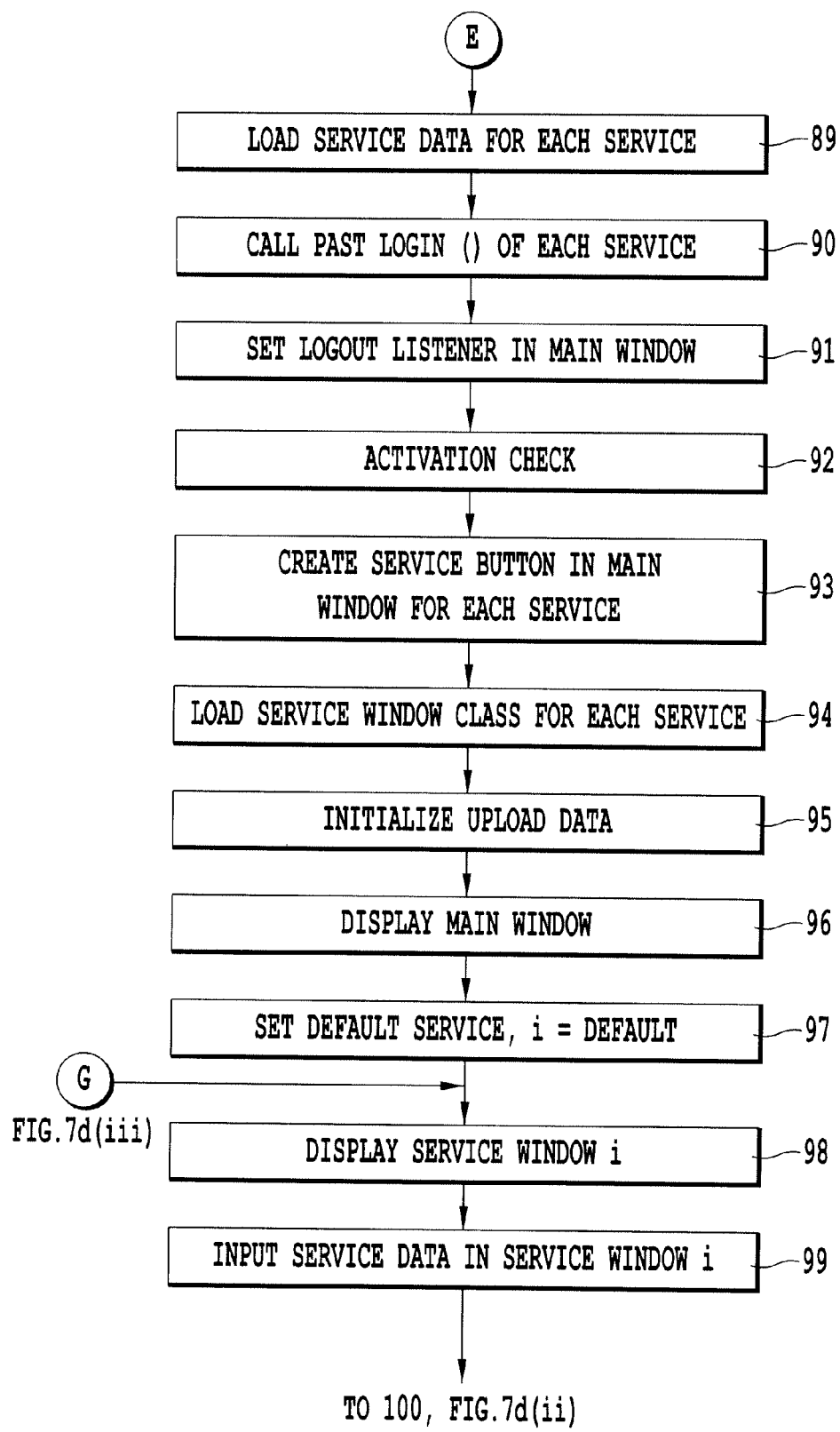
Figure 7E:
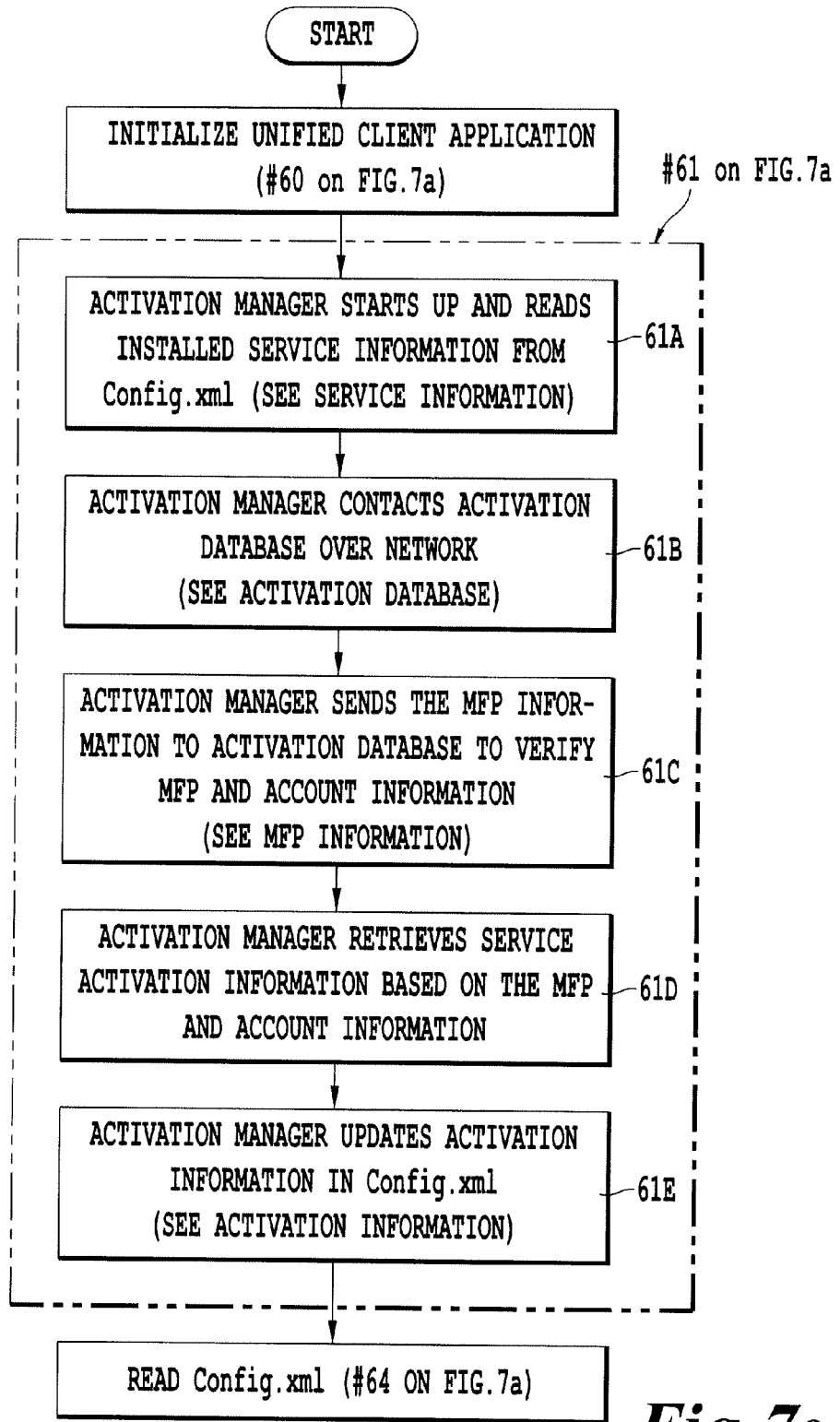

FIG. 7E shows a more detailed description of the activation manager 6*a* workflow. Specifically, FIG. 7E shows the internal process of step 61 shown in FIG. 7A. Once step 60 in FIG. 7A is complete, the flow moves to step 61. Step 61 is made up of five steps 61A-E. In step 61A the activation manager 6*a* starts up and reads the previously installed config.xml file 7. Included in the config.xml file 7 is MFP information, further discussion of the contents of the config.xml file 7 can be found below with regard to FIGS. 11A-11B.

The activation manager then contacts an Activation Database over a network in step 61B and sends information regarding the MFP to the Activation Database to verify the MFP and account information in step 61C. The Activation Database may be a remote cross referenced database that stores information regarding the activation status of each project and service included on the MFP. In step 61D the activation manager 6*a* retrieves activation information from the Activation Database based on the sent MFP information. The activation information is information regarding the activation status of the projects and services included on the MFP. The activation manager 6*a* then updates, in step 61E, the activation information in the config.xml file 7 based on the received information.

It should be noted that although in the present embodiment the activation manager updates the config.xml file 7 by contacting an activation database. In an alternate embodiment the activation information could be retrieved from another MFP in the network that had contacted the activation database at a previous time.

In FIG. 7B, the project array window 32 is created in step 70 using the project array. The project array window 32 will only display projects that are activated or are available for activation by the user utilizing the MFP. Thus if the user utilizing the MFP does not have the authority to activate new projects then only the previously activated projects will be available for selection. The project array window 32 is then displayed in step 71 and in step 72 a project is selected based on manual user input.

Once the project is selected by step 72, step 73 checks to see if the selected project is activated. If the answer is no then the flow proceeds to step 74 where an activation window will allow the user to activate the selected un-activated project. In step 75 it is determined if the user has decided to activate the project. If the user decides to not to activate the selected project the flow will return to step 71 where a new project can be selected. However, if the user decides to activate the selected project in step 74 then flow will proceed to step 76 where the config.xml file will be updated to include the activation information for the newly activated project. Once the config.xml file is updated in step 76 the service array is constructed for the newly activated project in step 77 and the flow proceeds to step 78.

Returning to step 73, if the selected project is activated then the flow proceeds to step 78 where the selected project is initialized.

As a general procedure, steps 70-78 perform a process that checks to see if the selected project is activated. If the selected project is not activated then the system allows activation.

Turning now to FIG. 7C, from C in FIG. 7B step 80 determines if the initialized project includes a login window plug-in 37. If no login window plug-in 37 is installed, flow proceeds to process E of FIG. 7D. If the project includes a login window plug-in 37, then the flow proceeds to step 81 where it is determined if the login plug-in is activated. If the login plug-in is not activated, flow proceeds to process E of FIG. 7D. If the login plug-in is activated then flow proceeds to step 82 where both the login window class and the login data class are loaded.

Once the class files have been loaded, the login window is displayed in step 83. The login window includes both a login button and a cancel button. Depending on which button is pressed in step 84 the flow proceeds differently. When the login button is pressed the flow proceeds to step 85 in which the process login function of the login window plug-in 37 is called. However, if the cancel button is pressed in step 84, the flow proceeds to process D in FIG. 7B. Process D returns the flow to step 70.

If the login button is pressed in step 84 the login function of the login window plug-in 37 is called in step 85. Step 86 checks to see if the login was successful. If the login was not successful, the flow proceeds to step 87 to reset the login window and then returns to step 83. If the login was successful, then the flow proceeds to process E in FIG. 7D.

Thus FIG. 7C includes the general procedure of completing authentication if the login window plug-in 37 is installed in the selected project 33a . . . n. If no login window plug-in 37 is installed or the plug-in 37 is not activated, then the entire login process is skipped.

Turning now to FIG. 7D, in step 89, service data for each service is loaded. Once the service data is loaded, the flow proceeds to step 90 where the post-login function of each service is called. In step 91, the logout listener is set in the main window 35. In step 92, the activation status of each service is checked. At least one service will be activated for each activated project. If the user is not able to activate services only the activated services will be available in step 93, otherwise all installed services will be available. Additionally, in step 93 a service button for each service 38a . . . n is created in the main window 35. The service window class for each service is then loaded in step 94 and the upload data 50 is initialized or created in step 95.

Once the upload data 50 is initialized in step 95, the main window 35 is displayed to the user in step 96. The default service is then selected in step 97. It should be noted that the default service will always be an activated service. Then the service window corresponding to the selected service is displayed in step 98. In step 99 service data is input in the service window displayed in step 98. The flow then proceeds to step 100 which checks if the auto-logout time has expired. The auto-logout feature forces the flow to proceed to the logout step 101 if no user activity is detected for a predetermined period of time. If the auto-logout time is determined not to have expired in step 100 the flow proceeds to step 101 which determines if a button was pressed. If a button was pressed the flow proceeds to step 102, if not the flow returns to step 100. Step 102 determined which button was pressed. If one of the service buttons was pressed, then the flow proceeds to step 107 where it is determined if the selected service is activated. If the selected service is not activated then flow proceeds to step 108 where the user have the ability to activate the unactivated selected service. Flow then proceeds to step 109 where it is determined if the selected service was activated in step 108. If the service was not activated in step 108 the flow returns to step 98 where the default service window is again displayed. If the selected service was activated in step 108 then flow proceeds to step 103.

Returning to step 107, if the selected service is activated then flow proceeds to step 103 where the selected service is set. The flow then returns to step 98 where the newly selected service window is displayed. If in step 102 the logout button is pressed the flow proceeds to step 104 where each service is reset, the main window 35 is reset and the upload data is reset.

If the MFP "start button" is pressed by user in step 102 the flow proceeds to step 105. In step 105 the scan is completed. The flow then proceeds to step 106 where the upload data 50 is copied and added to the job queue 53.

Figure 8A:
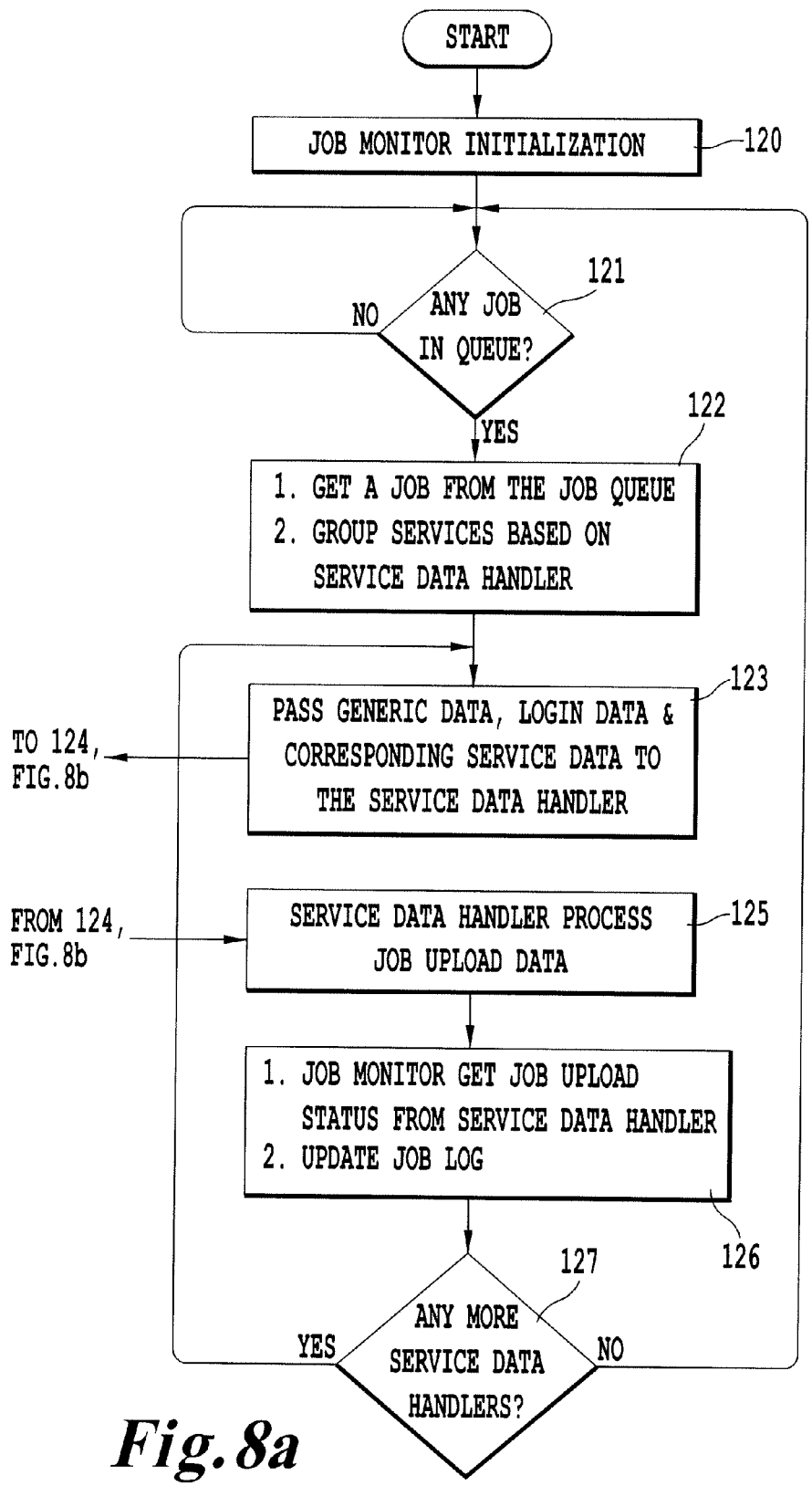
FIGS. 8A and 8B are a flowchart of the Unified Client Upload thread.
Figure 8B:
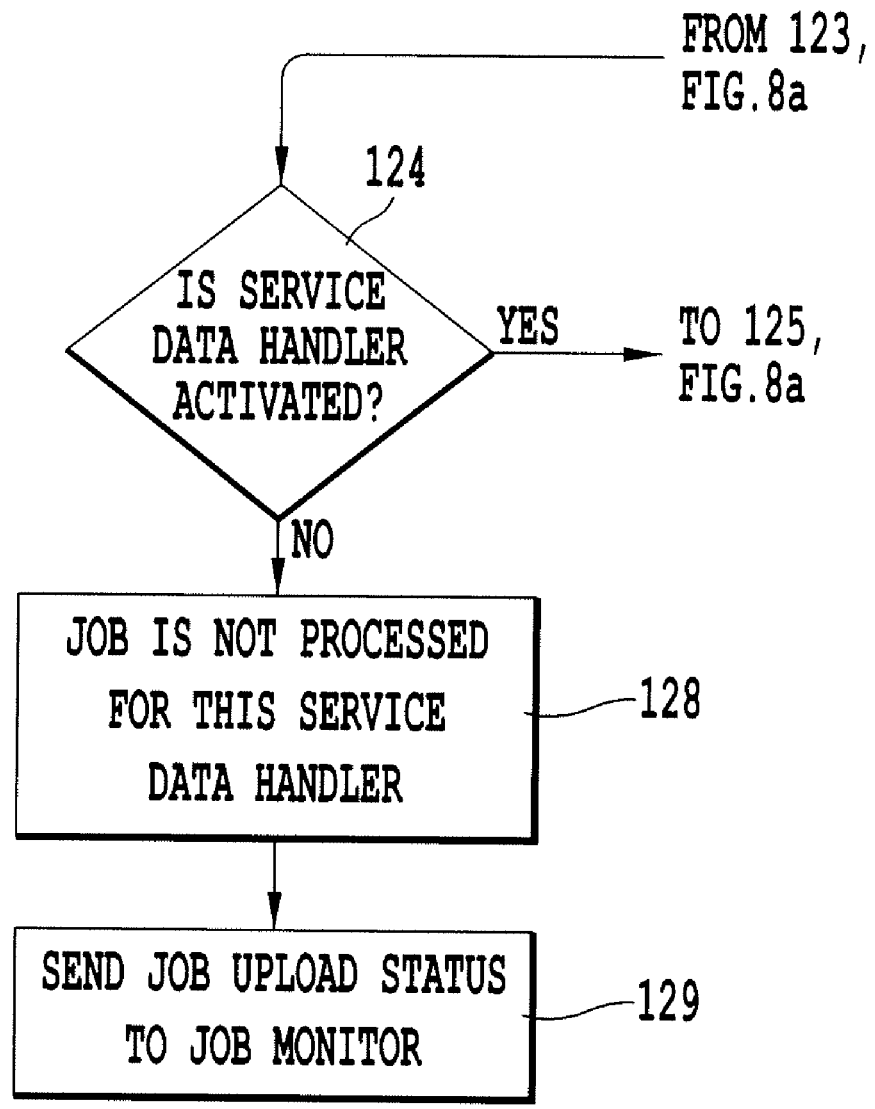

Turning now to FIGS. 8A and 8B, FIGS. 8A and 8B show a flowchart of the unified client upload thread 51. After starting, a job monitor initialization is performed in step 120. The system then checks if any jobs are in the job queue 53 in step 121. If no jobs are determined to exist in the job queue 53, flow proceeds back to the beginning of step 121. The system continues in this for a loop until a job is observed in the job queue 53.

When a job is determined to exist in the job queue 53 in step 121, flow proceeds to step 122 and gets the job from the job queue 53 and groups services included in the job based on the corresponding service data handler 54a . . . n. Next, the generic login data and corresponding service data is passed to the service data handler 54a . . . n in step 123. In step 124 it is determined if the service data handler 54a . . . n is activated. If the service data handler is not activated flow proceeds to step 128 where the job is not processed for the service data handler 54a . . . n. The flow then proceeds to step 129 where the job upload status is sent to the job monitor. Flow then proceeds to step 127.

If however in step 124 the service data handler 54a . . . n is activated, the service data handler 54a . . . n then processes the job upload data 50 in step 125.

Once the service data handler 54a . . . n has processed the job upload data 50, the job monitor 51 gets the job upload status from the service data handler 54a . . . n and updates the job log in step 126. Flow then proceeds to step 127 which checks to see if there are any more service data handlers 54a . . . n. If no service data handlers 54a . . . n remain for the job, then flow moves back to step 121 to check for new jobs in the queue. If more service data handlers 54a . . . n are included in 127, flow proceeds back to step 123 and processes steps 123-126 again. This loop continues until no service data handlers 54a . . . n remain for a job.

Thus the unified client upload thread includes two loops, the first checks for new jobs in the queue. The second loop occurs once a job is determined to exist, in the second loop, the system loops through checks to make sure all of the activated service data handlers 54a . . . n in a job have been processed.

Figure 9:
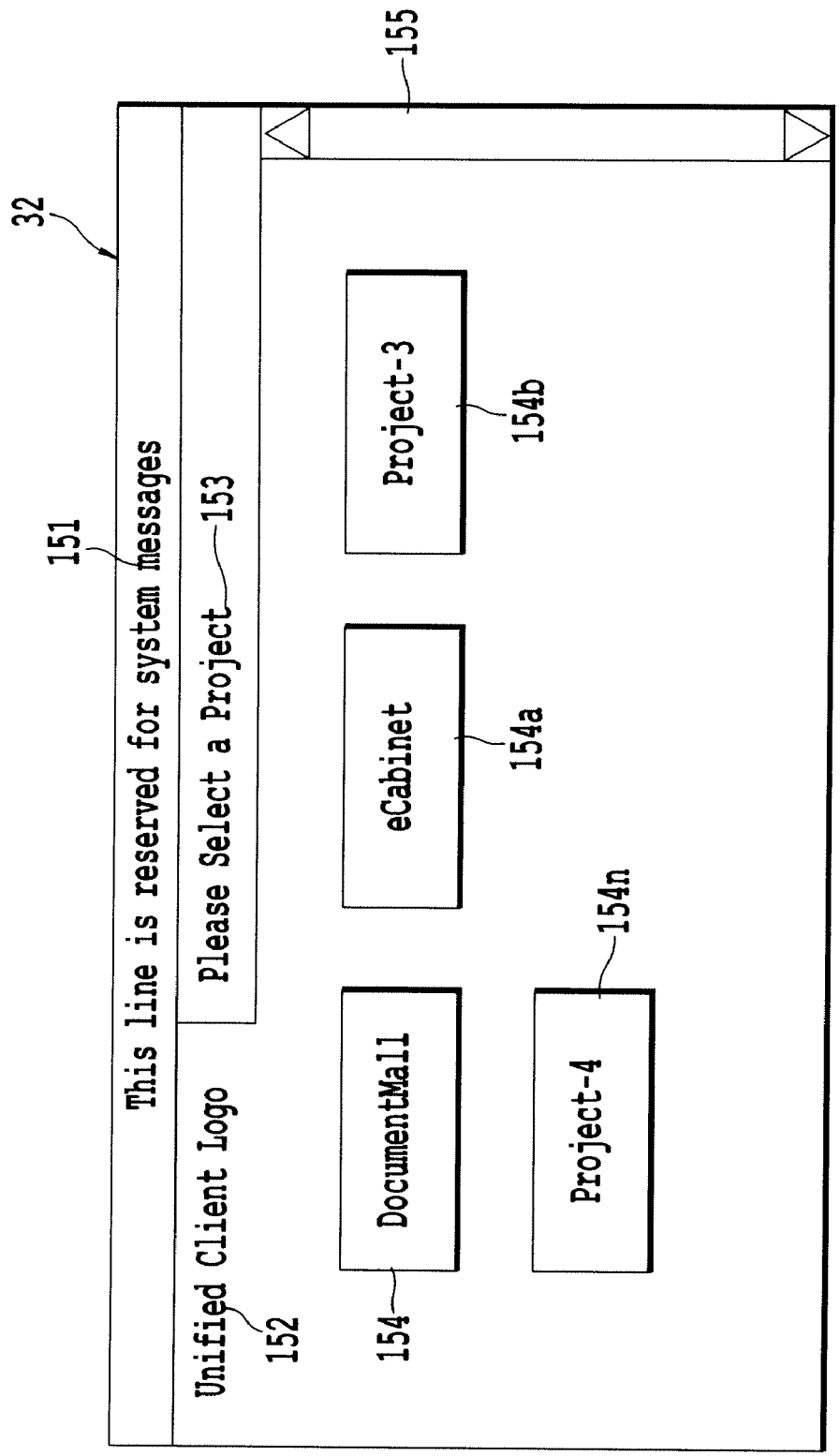
FIG. 9 shows an exemplary project array window which allows the user to select a project.

Moving now to FIG. 9, there is shown an example of a project array window 32. The project array window 32 includes a line reserved for system messages 151. Also included is a unified client logo 152 and instructions to the user on how to use the project array window 153. The project array window 153 also includes several project buttons that are selectable by the user 154 and link the user to the main window 35 and default service window of the selected project 33a . . . n. Examples of such buttons are the Document Mall button 154, the eCabinet button 154a or other similar type projects buttons 154b, 154n. The scroll bar 155 allows a number of project buttons to be installed in the project array window 32. Thus the function of the project array window 35 is to allow a user to select which project 33a . . . n the user may like to use on the MFP.

Figure 10:
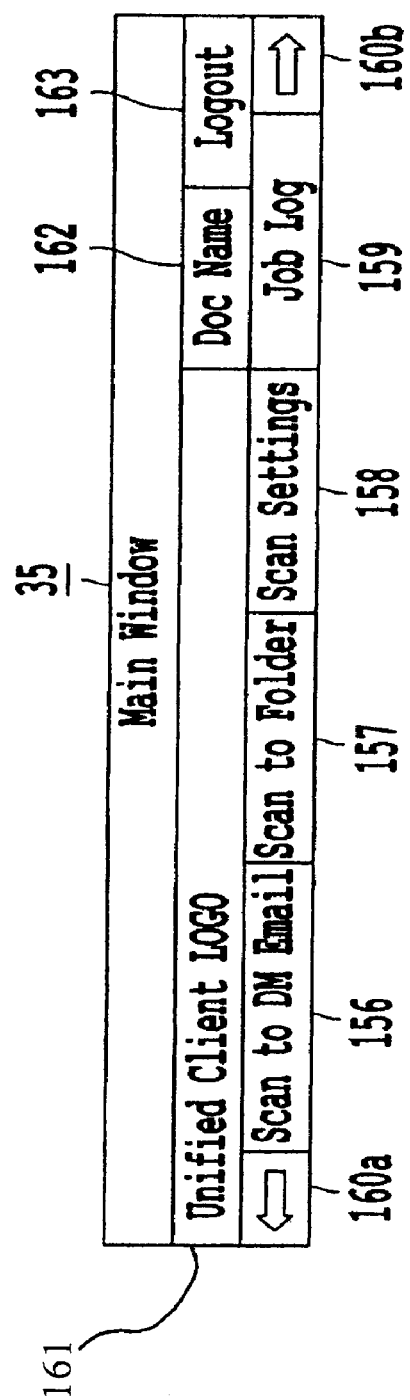
FIG. 10 shows a main window which allows the user to select different services of the selected project.

FIG. 10 shows an example of a main window 35. The main window 35 includes the unified client logo 161 as well as the document name 162 and a logout button 163. As discussed earlier with respect to FIG. 7d, the logout button 163 allows the user to log out of the selected project and return to the project array window 32 described in FIG. 9. The main window 35 also includes a number of buttons 156 through 159 which correspond to a number of services. The buttons displayed in the main window 35 correspond to the project 33a . . . n which was selected in the project array window 32. For example, when the Document Mall project is selected 154 in the project array window 35, several Document Mall related buttons are available. For example, the button 156 allows the user to open a scan to a Document Mall e-mail service window. Item 157 allows the user to open a scan to a folder service window. Item 158 is a button that open up the scan settings service window. While item 159 allows the user to open up the job log service window. The invention is not limited to the number of buttons included in FIG. 10 or the services shown in FIG. 10. Additionally arrow buttons 160a and 160b allow the user scroll through a number of service buttons. Thus, any type of service button can be installed on the main window 35.

FIGS. 11A-11B show an example a config.xml file 7 which includes activation information. It should be noted that FIGS. 11A-11B are not intended to be a comprehensive example of how a config.xml file 7 may be designed. Instead FIGS. 11A-11B include one way that a config.xml file 7 might be written for activation of a unified client application 5.

FIG. 11B begins with MFP tag on line 1 which opens the MFP section of the config.xml file 7. The MFP section includes several tags which relate the MFP and the account associated with the MFP. On line 2 is found the MFPSerialNo tag which includes the MFP serial number. The MFP serial number is a unique number which identifies the hardware of the MFP. On line 3 is found the MACAddress tag which includes the MFP MAC Address. The MAC address is a unique network identification code that identifies the network interface of the MFP. On line 4 is found the AccountName tag which includes the account name to which the MFP is registered. In the present example the account name is Ricoh.

On line 5 the UserName tag is found which includes the username of the user currently logged into the MFP. It should be noted that in alternate embodiments no UserName tag is used. In addition, the ModelName tag not shown in FIG. 11A can be included in the MFP section. The ModelName tag identifies the model name of the MFP. Finally on line 6 the close MFP tag is found which identifies the end of the MFP section. As noted above with regard to FIG. 7E, the portion of the config.xml file 7 enclosed in the MFP tags is the MFP information sent to the activation database. The MFP information is then used by the activation database to determine which services are activated. Thus the data in the MFPSerialNo, MACAddress and ServiceName tags can be used as a unique key.

Line 7 of FIG. 11A includes a service open tag and begins a new service section in the config.xml file 7. On line 8 is found the ServiceName tag which includes the service name of the service. In the present example, the service name DME-mail denotes the DocumentMall Email Service. On line 9 the DisplayName tag includes the display name of the service. In the present example the display name "Document Mall Email" is shown. The display name setting shows how the service will be displayed in the service buttons in the main window 35.

Line 10 shows the Activation open tag. This tag begins the activation section of the service. Included in the activation section are several tags related to the activation of the service. The examples shown in FIGS. 11A and 11B are one way of including activation information in the config.xml 7 file, other ways are also possible. On line 11 the ActivationRequired tag is found. This tag includes a boolean indicator which denotes whether or not activation is required for the service in question. In the present example, shown on line 11, the ActivationRequired tag is listed as "Y", however if the tag included a "N" or "F" indicator the service would always be available to be used on the MFP. The default value for this tag is "Y".

The next tag in the activation tag section is the Activated tag which is found on line 12. As with the ActivationRequired tag noted above, the Activation tag includes a boolean indicator. The Boolean indicator corresponds to whether or not the service in question is activated. If the indicator shows "N" or "F" then the service will not be available to the user of the MFP unless the user goes through an activation process. In the present example the Activated tag includes a "Y" indicator. When a "Y" indicator is found in the Activated tag, the ActivationDate and ExpirationDate tags found on lines 13 and 14 list the date that the service was activated and the expiration date of the activation, respectively. The ExpirationDate tag is useful in the case that the Activation Database is unable to be contacted. If the Activation Database is unreachable, the activation manager can compare the internal date stamp of the MFP with the information found in the ExpirationDate tag of the config.xml file 7 to ensure that the activation is still valid. Finally, the Activation close tag is found on line 15.

In should be noted that several different tags may be used in the Activation Section depending on the type of activation used. In the present example, time-based activation is used, however, when different types of activation are used different tags may be used in the activation section.

In lines 16-19, the service window class file is listed. The service window class file includes all the code necessary to display the service window. In lines 20-23 the data handler class file is listed. This includes all the code necessary for the data handler in this service. Beginning on line 24, configuration data for this service is included. In this example, on line 25, the DocumentMall server address is listed as documentmall.com. The address documentmall.com is an example of an address that may be used, other addresses including IPv6 addresses or IPv4 addresses can also be used. Beginning on line 27, the data handler configuration data is included. In this example, the data handler configuration data is listed as optional. However, information such as FTP port or other similar data can be listed in this tag. On line 26-27, the data handler configuration data tag is closed and on line 29 the service is closed for the above noted service.

Line 30 includes a new service tag which corresponds to a new service. It should be noted that although the present example only includes two service sections, a service section corresponding to each service found on the MFP may be included in the config.xml file 7. On line 31 the ServiceName tag is found which, in the present example, shows the eCabinetFolder service and on line 32 the DisplayName tag is found which includes the name "eCabinet Scan to Folder."

Lines 33 of FIG. 11A to Line 1 of FIG. 11B show the Activation section for the eCabinetFolder service. As was described with regard to the DMEmail service above, the Activation section of the eCabinetFolder service includes open and close Activation tags, an ActivationRequired tag, an Activated tag, an ActivationDate tag and an ExpirationDate tag.

In lines 2-4 of FIG. 11B the service window class file is listed. The service window class file includes all the code necessary to display the service window. In lines 5-8 the data handler class file is listed. This includes all the code necessary for the data handler in this service. Beginning on line 9, configuration data for the DMEmail service is included. In this example, on line 10 the eCabinet server address is listed as eCabinet.com. The address eCabinet.com is an example of an address that may be used, other addresses including IPv6 addresses or IPv4 addresses may also be used. Beginning on line 12, the data handler configuration data is included. In this example, the data handler configuration data is listed as optional. However, information such as FTP port or other similar data can be listed in this tag. On line 12-13, the data handler configuration data tag is closed and on line 14 the service is closed for the DMEmail service.

It should be noted that the foregoing example does not show project tags or corresponding project activation sections, the config.xml file 7 may include activation sections in subordinate to the project tag in a similar manner to the placement of the activation section in each service section described above and illustrated in FIGS. 11A-B.

A functional example of the unified client application 5 installed on a multi-function printer will now be described in FIGS. 12-16. In this example, the unified client application 5 is installed with the eCabinet plug-in 8b. The unified client application 5 with an eCabinet plug-in 8b is developed using SDK/J and uses the CVM option on each MFP in which the unified client application 5 is installed. SDK/J is an embedded software architecture software development kit ("SDK") which allows in house developers, independent software vendors and system integrators to deliver customized JAVA based solutions on MFPs. The CVM option is the java virtual machine that is able to be installed on the MFP. Other types of virtual machines and/or programming languages can be used to create plug-ins associated with the unified client application.

The example of the unified client application 5 with the eCabinet plug-in 8b uses 2 SDK/J type applications, the 2 SDK/J applications are, for example, one Java xlet application which implements major unified client functionalities and one servlet application which allows user to update the config.xml file 7 remotely via a web browser. Some of the services that are supported by the unified client application 5 with the eCabinet plug-in 8b are: scan to eCabinet server, scan to eCabinet folder, scan settings and job log viewing. These services are represented as service buttons in the eCabinet project main window 35. In the case that the unified client application 5 only includes one project 33a . . . n installed, such as in the present example, a default service window is the first window displayed along with the main window 35.

Figure 12:
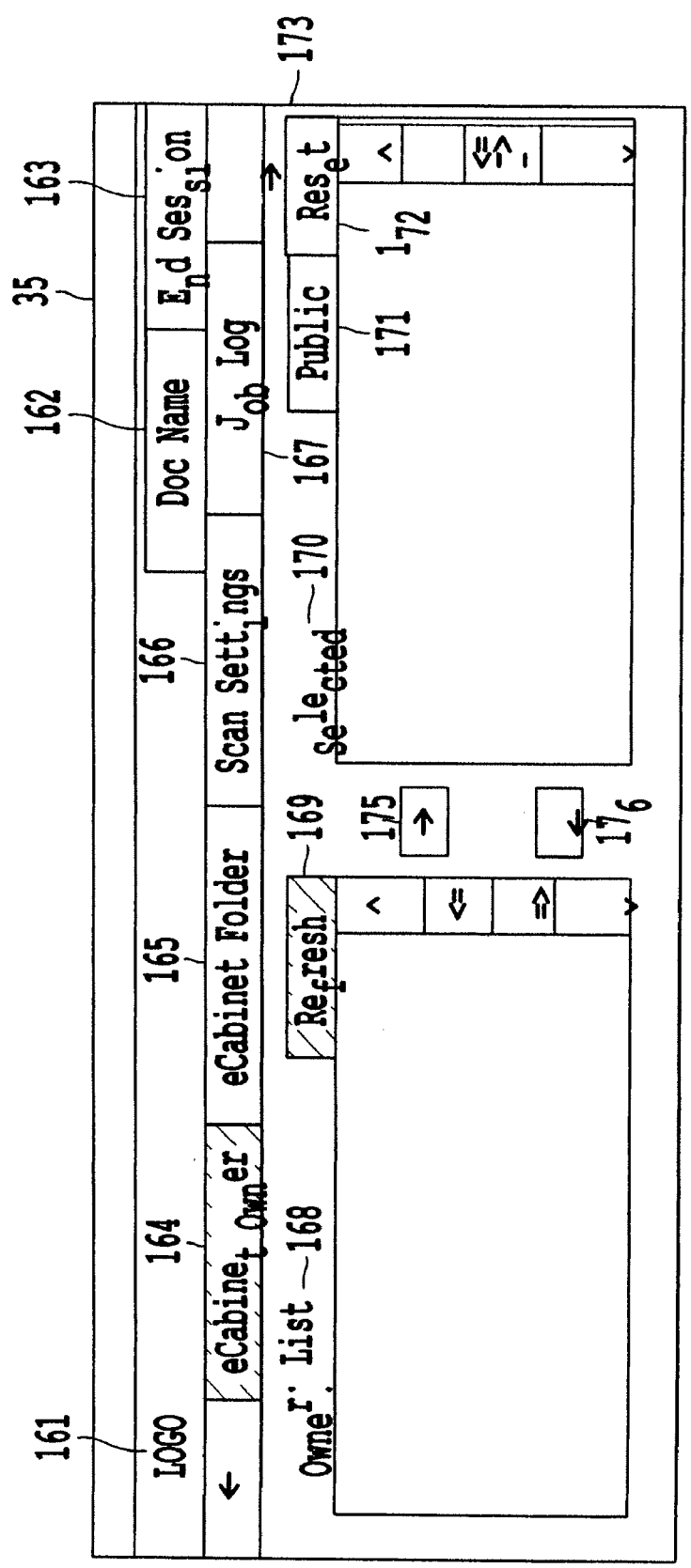
FIG. 12 is exemplary user interface of an eCabinet™ plug-in in which the eCabinet project main window and the eCabinet Owner service window are displayed.

In FIG. 12, an example of a main window 35 and service window 173 is shown. The main window 35 and the eCabinet owner service window 173 are displayed. The main window 35 includes a logo 161 as well as the document name 162 and an end session or logout button 163. Further, several service buttons 164-167 are also included in the main window 35. In the eCabinet example, the first service button is the eCabinet owner button 164. In FIG. 12, this button is selected and as a result the corresponding eCabinet owner service window 173 is displayed. The left side of the eCabinet owner service window includes an order list window 168 and a refresh button 169. Further, on the left side of the eCabinet owner service window 173 there is a selected owner's window 170. Also included are a public 171 and reset button 172. The eCabinet owner button offers users the scan to eCabinet owner service. The owner list is downloaded from the eCabinet server automatically and is displayed in the owner list window 168. Multiple owners can be selected if no eCabinet folder is selected in the eCabinet folder window 193. When an eCabinet folder is selected in eCabinet folder window 193, only a single owner selection is allowed. The owner list window 168 shows a list of the owners. The selected window 170 shows the destination owners. To add a destination owner, the user can highlight desired owners in the owner list window 168 and press the right arrow button 175. To delete a destination owner, the user can highlight the owner in the selected window 170 and press the left arrow 176. The refresh button 169, allows the user to download the owner list from the server again. The public button 171 allows the user to set the attribute of the scan document to public or private. The reset button 172 allows the user to remove all of the contents of the selected window.

Figure 13:
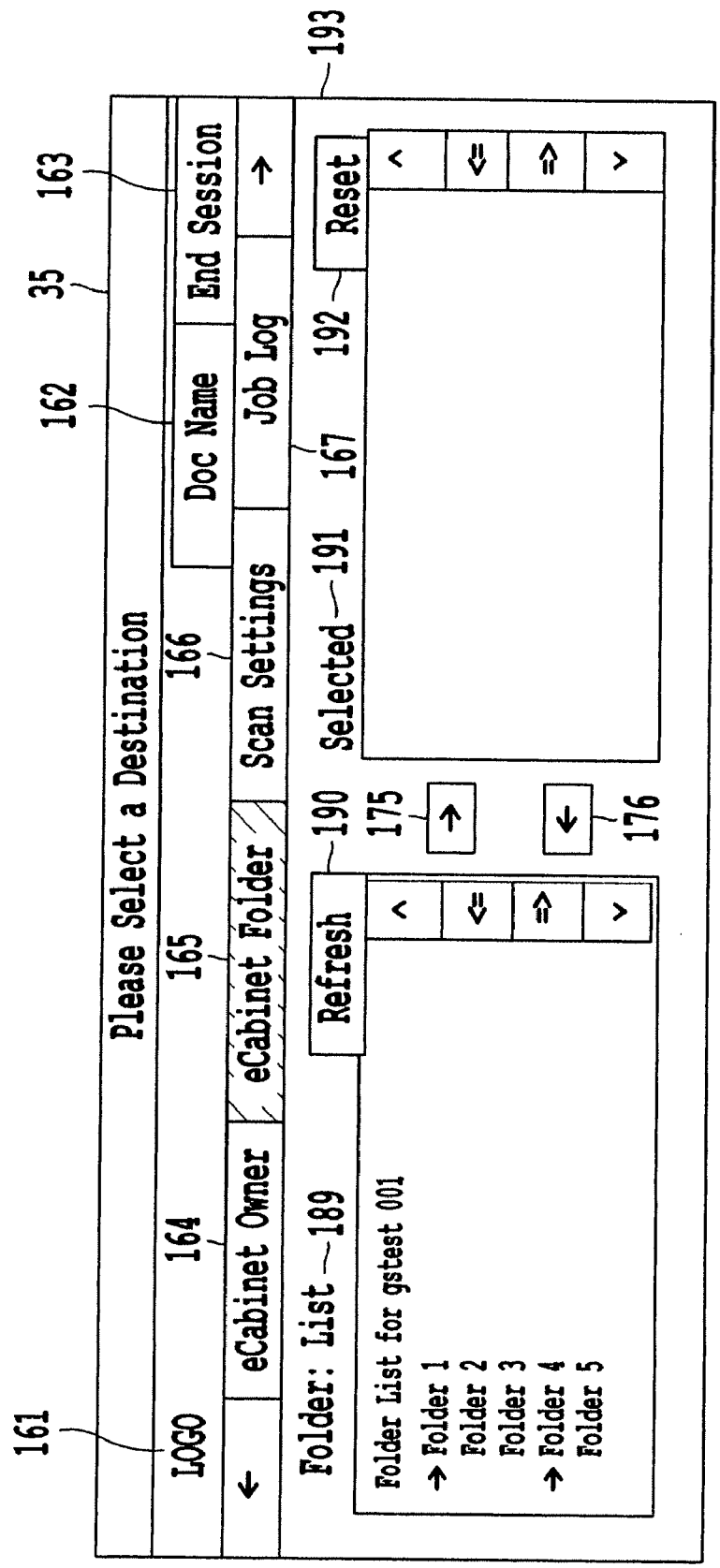
FIG. 13 is an exemplary user interface of an eCabinet plug-in in which the eCabinet project main window and eCabinet Folder service window are displayed.

FIG. 13 shows an example of the main window 35 with the eCabinet folder service button 165 selected and the eCabinet folder service window 193 displayed. In this example the eCabinet folder button 165 has been selected and as a result the eCabinet folder service window 193 is displayed. The eCabinet folder service window 193 includes a folder list window 189, a refresh button 190, a selected window 191, and a reset button 192. The eCabinet folder service offers users the ability to scan to the eCabinet folder service. The eCabinet folder list is downloaded from the eCabinet server automatically using the configuration settings included in the config.xml file 7. When users select the eCabinet folder button 165 the unified client application 5 prompts user with a software keyboard to enter a user name and a password. The unified client application 5 then downloads the user's folder tree and displays the tree in the folder list window. Note that using the eCabinet folder service requires single owner selection. If multiple owners have been selected in eCabinet owner service window 173 and the user presses eCabinet folder button 165 an error message will pop up stating eCabinet folder service requires single owner selection. The folder list window 189 shows a user's eCabinet folder tree. The user can browse the folder tree in the folder list window 189. To add a destination folder, the user can highlight the desired folder in the folder list window 189 and press the right arrow button 175. To delete a destination folder in the selected window 191, the user can highlight the desired folder in the selected window 191 and press the left arrow button 176. It should also be noted that multiple folders can be selected. The refresh button 190 allows the user to download the eCabinet folder list again from the eCabinet server. If the refresh button 190 is pressed, the user will be prompted for the user name and password entry again. The reset button 192 allows all the contents placed in the selected window 191 to be removed. It should also be noted that the eCabinet folder list included in the folder list window 189 is dependent upon the owner selected in the eCabinet owner service window 173 included in FIG. 12. The user that is selected and included in the selected window 170 is the user who corresponds to the folder list included in the folder list window 189.

Figure 14:
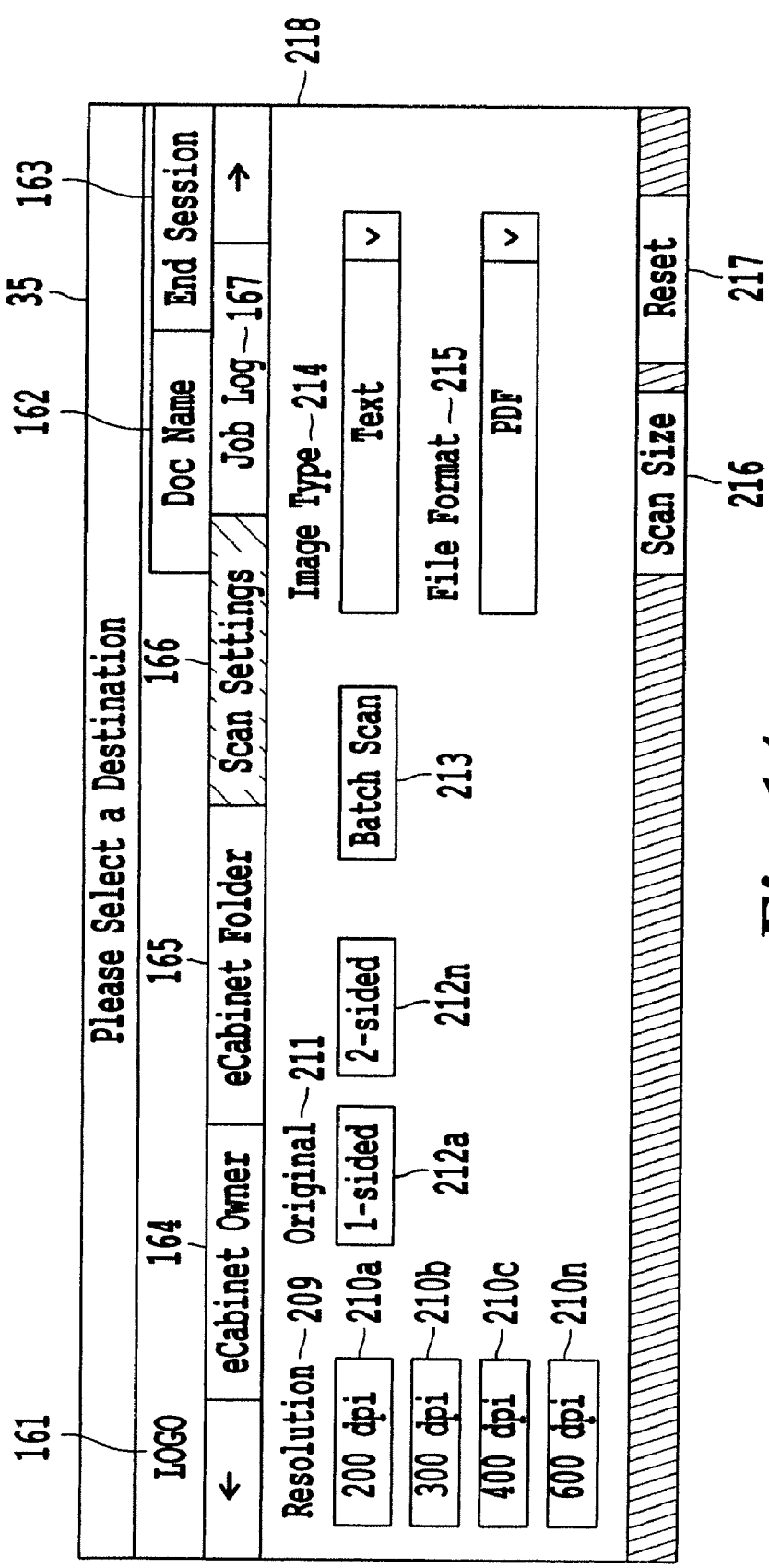
FIG. 14 is an exemplary user interface of an eCabinet plug-in in which the eCabinet project main window and the scan settings service window are displayed.

FIG. 14 shows the user interface for an example of when the scan settings button 166 is selected. When the scan settings 166 button is selected, the scan settings service window is displayed 218. The scan setting service window includes several options including resolution 209, original 211, image type 214 and file format 215. Under the resolution option 209, several different buttons relating to scanner resolution are used. In this example, DPI 200, 210a, 300 DPI, 210b, 400 DPI, 210c, or 600 DPI, 210n, are available to be selected. Other similar types of DPI options resolution options could also be used. The original option 211, includes two buttons. The first button 212a allows the one sided option to be selected. The second button 212n allows the two sided option to be selected. Further, a batch scan button is displayed 213. The image type option 214 also includes a drop-down menu listing a number of image types. In the current example, the text option is displayed. It should also be noted that in the image type drop-down box text, photo, gray scale or photo options are available. Similarly, under the file format option 215, a second drop-down box is included listing a number of different file formats. In the present example, the PDF option is displayed. However, in the file format drop-down box single page tiff, multi-page tiff, jpeg and PDF options are available. Also included on the scan setting service window 218 is a scan size 216 button and a reset button 217.

Figure 15:
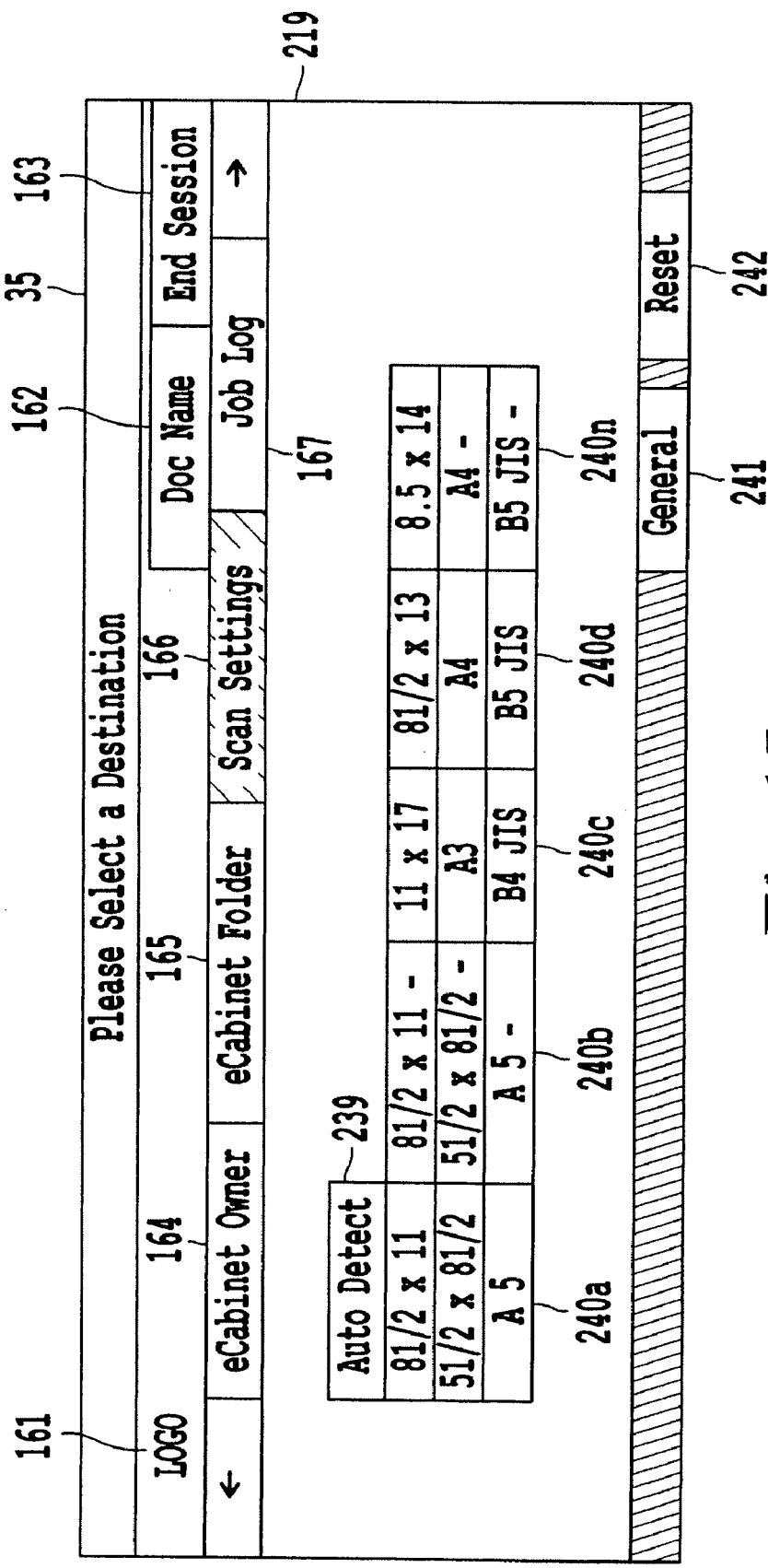
FIG. 15 is an exemplary user interface of an eCabinet plug-in in which the eCabinet project main window and the scan settings service scan size sub-window are displayed.

The scan size button 216 opens a new window which is shown in FIG. 15. The scan size window 219 is still part of the scan sittings service window 218. However, the scan size window 219 is displayed in place of the scan setting service window 218 under the main window 35. In the scan size window 219, several different options are available. For example, auto detect 239, 8×11 5½×8½ A5, 240a, 8½×11 5½×8½ A5 240b, 11×17 a3, B4 JIS 240c, 8½×13 A4 B5 JIS 240d, and 8½×14 A4 B5 JIS 240n. Also included are a reset button 242 and a general button 241 which returns the user to the original scan settings service window 218.

Figure 16:
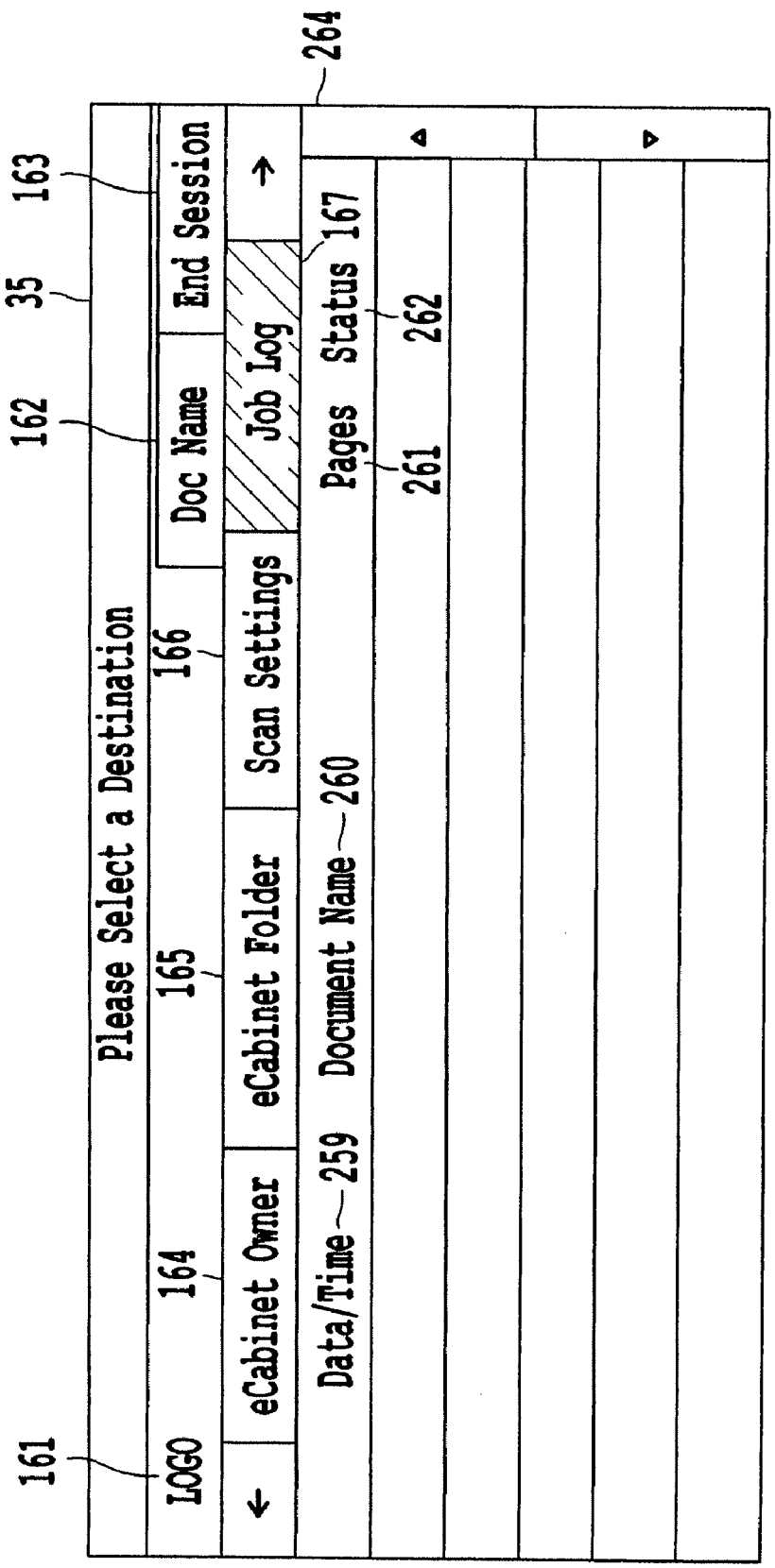
FIG. 16 is an exemplary user interface of an eCabinet plug-in in which the eCabinet project main window and the job log service window are displayed.

FIG. 16 shows the main window 35 and the job log service window 264 displayed when the job log button 167 is selected. In the job log service window 264 date and time 259, document name 260, pages 261 and status 262 titles are displayed. From the job log service window 264 users can check scan job upload status specifically through the date and time, the document name, number of pages and the status of the job. This concludes the MFP display example of the eCabinet plug-in 8b.

Figure 17:
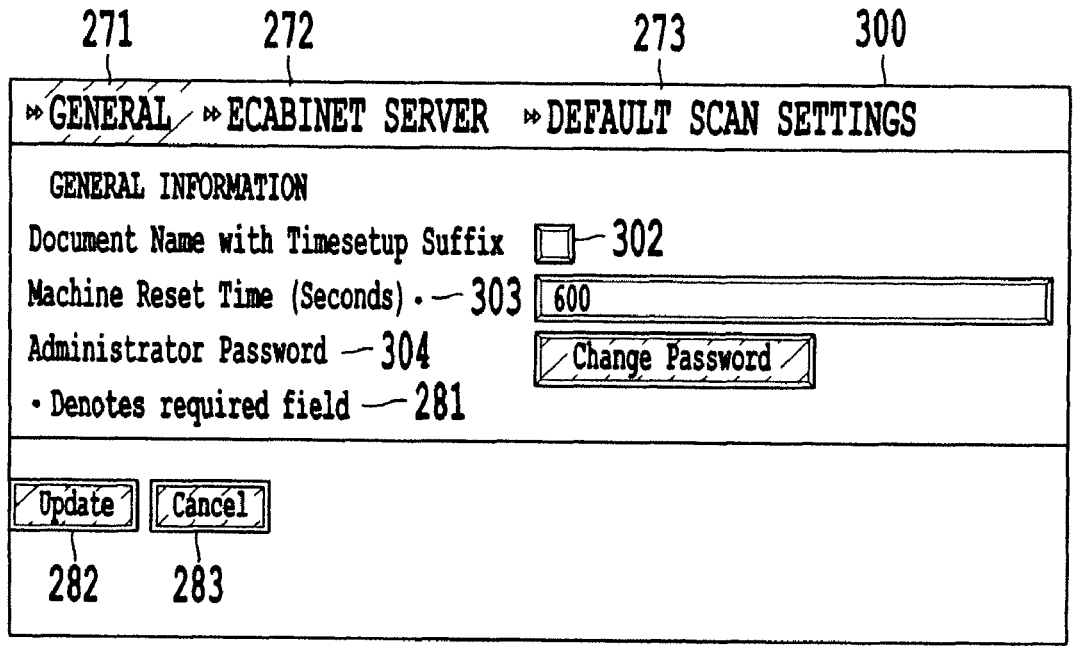
FIG. 17 shows a general configuration screen displayed by the Unified Client remote configuration web page.
Figure 18:
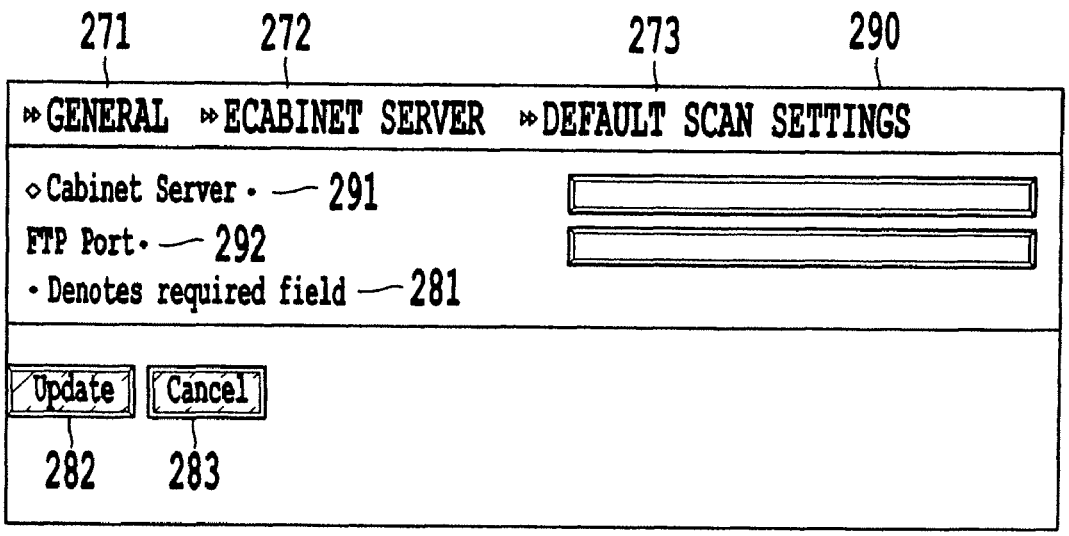
FIG. 18 shows an eCabinet server screen displayed by the Unified Client remote configuration web page.
Figure 19:
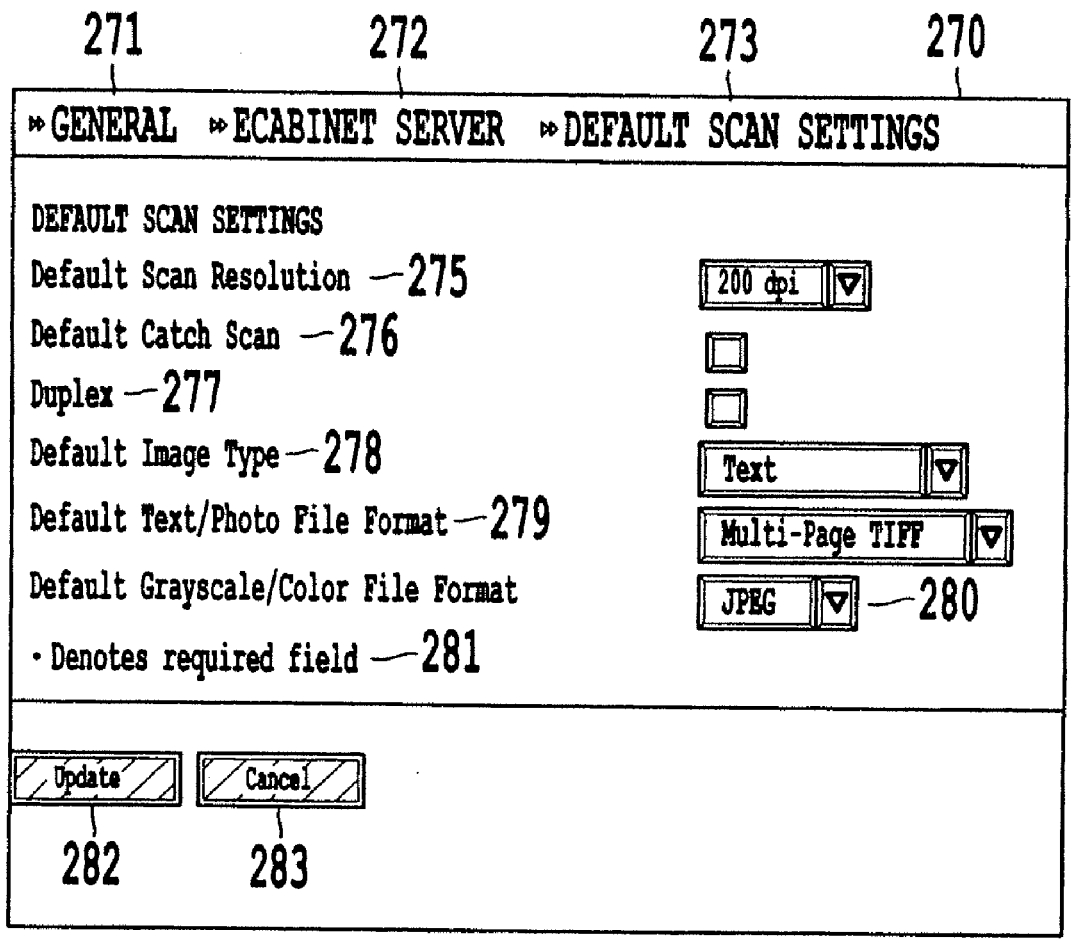
FIG. 19 shows a default scan settings screen displayed by the Unified Client remote configuration web page.

FIGS. 17-19 show an example display for managing the settings of the eCabinet plug-in 8b remotely. The unified client application 5 with the eCabinet plug-in 8b can be configured remotely through web access. For security purposes the website is protected by a password. FIGS. 17-19 show an example of the remote configuration website for eCabinet plug-in 8b.

FIG. 17 shows an example of the general configuration window 300 on the remote configuration website of the unified client application 5 with the eCabinet plug-in 8b installed. When a user accesses the website shown in FIG. 17 three options will be shown. The general window button 271 the eCabinet server button 272 or the default scan settings button 273. These three options correspond to three screens: the general screen 300, the eCabinet server configuration screen 290 and the default setting configuration screen 270. Several settings are configurable through the general configuration screen 300 that is selected by the general button 271 and is the default screen loaded. First the enable/disable document name with time stamp suffix 302 is checkable. The machine reset timer seconds 303 is available to be changed. The machine reset timer seconds 303 setting relates to an auto session logout with refresh timer. In this example, 600 seconds is placed in the auto session refresh timer. The change administrator password option 304 is also available to be selected; this setting allows the user to change the administrative password for using the remote configuration service. It should also be noted that reinstallation can reset the password to the default. Also included are update 282 and cancel 283 buttons which allow the user to update and to apply the changes that the user has made in the general configuration window 300 or cancel the changes.

FIG. 18 shows the result when the eCabinet server button 272 is selected. The eCabinet server button displays the eCabinet server window 290 which allows the following options: eCabinet server address and FTP port. Both of these are required fields as is shown in 281. The eCabinet server address 291 and FTP port 292 can both be entered by the user. The FTP port 292 is automatically filled with the default ftp port. As with FIG. 17, update 282 and cancel 283 buttons are available.

FIG. 19 illustrates the example of when the default scan settings button 273 is selected. When the default scanning settings button is selected the default scan settings window 270 is displayed. In the default scan settings window 270 a number of options are displayed. First the default scan resolution 275 is available to be changed. In this example, 200 dpi is selected. In the unified client application 5 with eCabinet plug-in 8b installed the default scan resolutions of 200 dpi, 300 dpi, 400 dpi and 600 dpi are available and are displayed in the drop-down box in item 275. The default batch scan option is also selectable 276 along with the duplex 277 option. A default image type 278 is also available to be selected in the eCabinet plug-in 8b example. The default image types available in the drop-down box of item 278 are text, print, text photo, photo or grayscale. These image types correspond to different qualities of the scanned image. The next option available is the default text photo file format 279. In this example, the multi-page tiff option is selected. In the unified client application 5 with the eCabinet plug-in 8b installed the options available for the drop-down box of 279 are single page tiff, multi-page tiff or pdf. Single page tiff is a tiff image file that only includes a single image per file. The multi-page tiff is an image file that includes several images. PDF is a proprietary format to Adobe Systems which includes multiple page fixed-layout documents. The final option is default grayscale/color file format 280. In this example, jpg is selected as the default grayscale/color file format but the pdf option is also available in the unified client application 5 with eCabinet plug-in 8b installed. Item 281 shows required fields that must be selected. As with the FIGS. 23 and 24, update 282 and cancel 283 buttons are available. The update button 282 and the cancel button 283 allow the user to apply the changes with the update button 282 or cancel the changes with the cancel button 283.

Figure 20:
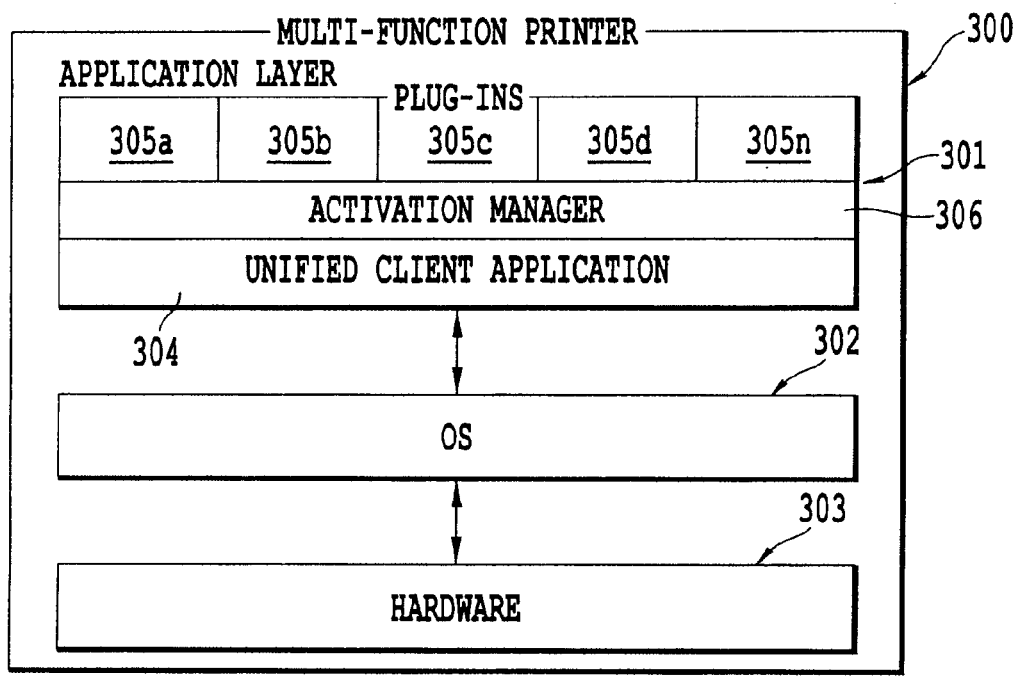
FIG. 20 is a block diagram showing a software configuration of the multi-function printer relative to the hardware and operating system according to an embodiment of the present invention.
Figure 22:
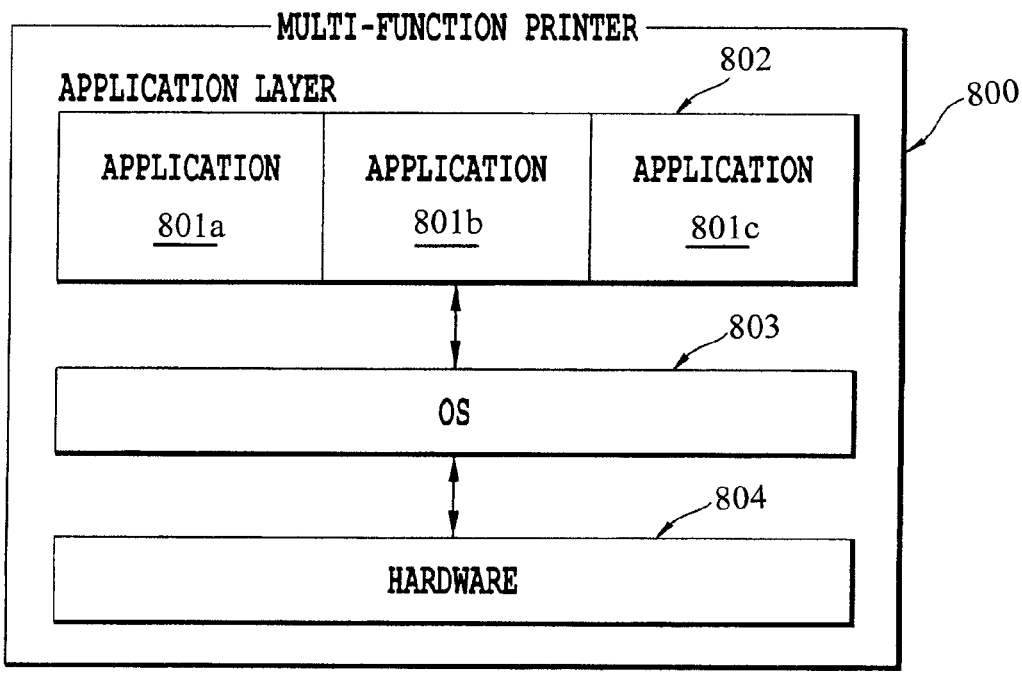
FIG. 22 is a block diagram showing a typical software configuration for a multi-function printer.

FIG. 20 is a block diagram of an MFP according to an embodiment of the present invention. As shown in FIG. 20, the MFP 300 includes an application layer 301, an OS 302, and hardware resources 303.

The application layer 301 includes the unified client application 304 as well as several plug-ins 305a . . . n which are included in the unified client application 304. It should also be noted that the unified client application includes an activation manager 306 that interfaces with the plug-ins and limits the plug-ins 305 ability to be accessed by the unified client application 304.

The application layer 301 is a position in a software hierarchy in which applications installed on the application layer 301, such as the unified client application 304, access the hardware 303 through the OS 302. Further the plug-ins 305a . . . n access the OS 302 and the hardware 303 via the unified client application 304 installed on the application layer 301.

It is also important to note that the application layer 301 is independent from the OS 302 and although the application layer 301 accesses the hardware through the OS 302 it is not a part of the OS 302.

The OS 302 is any operating system that accesses the hardware 303. Further, the OS 302 acts as a conduit for allowing applications that are installed on the application layer 301 to access the hardware 303.

The hardware 303 is the physical components of the multi-function printer. For example, hardware 303 can include a scanner, a printer, a fax or any other hardware component.

Figure 21:
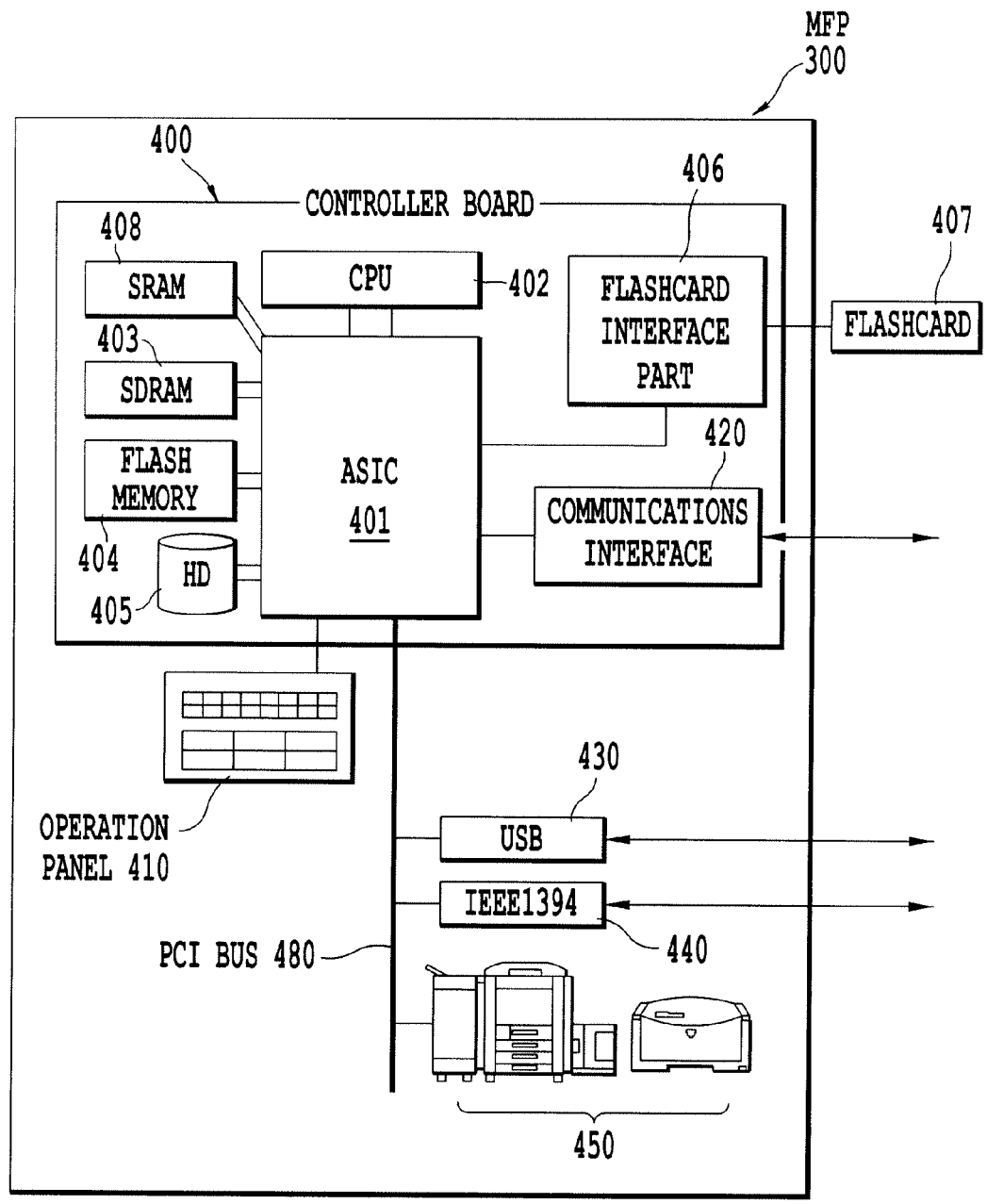
FIG. 21 is a hardware configuration of the image forming apparatus according to an embodiment of the present invention.

FIG. 21 shows an example of a hardware configuration of the MFP 300 according to an embodiment of the present invention. As shown in FIG. 21, the MFP 300 includes a controller board 400, an operation panel 410, a fax control unit (FCU) 420, a USB 430, an IEEE 1394 port 440, and a printer 450. It should be also noted that other types of i/o interfaces could be included including IEEE 1394b, USB 2.0. The controller board 400 includes a CPU 402 for processing and several storage devices such as SDRAM 403, SRAM 408, flash memory (flash ROM) 404, flash card interface part 406 and HD 405 used to store data associated with the MFP 300. Each of these components are connected to the ASIC 401, the ASIC 401 is an application specific integrated circuit that is designed specifically for use in a MFP 300. Other types of storage devices are also possible as well as other types of data processors and integrated circuits. The operation panel 410 is directly connected to the ASIC 401 as is the communications interface 420. The communications interface 420 can also be connected to a network or any other similar type communications medium. The USB 430, the IEEE 1394 440 and the multi-function printer functions 450 such as scanning, printing, and faxing are connected to the ASIC 401 via the PCI bus 480.

The SRAM 408 is a nonvolatile RAM, other types of SRAM are also possible. A flashcard 407 can be inserted into a flash card interface part 406, so that data is sent/received between the ASIC 401 and the flashcard 407 via the flash card interface part 406.

The operation panel 410 includes an operation part used for key operation such as key input and button pushing and the like by the user, and a display part for displaying drawing data such as various screens. It should be appreciated that other types of hardware components can be used in the present invention.

Further with respect to a computer readable medium such as a floppy disk, magnetic tape, CD-ROM and the like, by installing the program stored in the computer readable medium into an MFP, the MFP can perform the functions of the present invention.

This invention has been described with respect to a multi-function printer, but is applicable to any image handling device such as a copier, digital copier, printer, scanner, digital camera, fax machine, or multi-function printer or any combination thereof. A general purpose computer is not considered an image handling device. Moreover, the invention is applicable to other special purpose devices such as navigation systems, global positioning systems, vending machines, metering systems, machine tools and other tools which operate using programming or a programmed processor, automobiles, other transportation devices such as trains, motorcycles, planes, or boats, radar systems, radios, MP3 players, digital music players, and other audio systems, mobile phones, other communication devices and systems, and any other special purpose device which operates using a plug-in.

The present invention is not limited to the specifically disclosed embodiments, and variations and modifications may be made without departing from the scope of the present invention.

What is claimed is:

1. A method, comprising:
    launching a host application of an image handling device, the image handling device including at least one plug-in and a corresponding set of services;
    accessing a configuration file of the image handling device, the configuration file including information regarding the activation status of each service corresponding to the at least one plug-in, the activation status of each service indicates whether the respective service has been authorized for use;
    launching the at least one plug-in in response to the information regarding the activation statuses of each of the services indicating that at least one service, corresponding to the at least one plug-in, is activated, the plug-in providing the corresponding set of activated services to the host application; and
    presenting a graphical interface that includes a graphical indicia of each activated service corresponding to each activated plug-in.

2. The method according to claim 1, wherein the information regarding the activation of each service is generated utilizing information obtained by connecting to a database containing information regarding the activation of each service stored on the image handling device.

3. The method according to claim 1, wherein the information regarding the activation of each service includes a use time limit.

4. The method according to claim 1, wherein the configuration file is an XML file.

5. The method according to claim 1, wherein the information regarding the activation of each service includes a limit on the number of operations that can be performed on the image handling device.

6. The method according to claim 1, wherein the information regarding activation of each service is remotely input into the image handling device.

7. The method according to claim 1, wherein a user of the image handling device can modify the information regarding activation of each service by purchasing activation.

8. The method according to claim 7, wherein the user can purchase activation using an external device.

9. The method according to claim 8, wherein the external device is one of biometrics, a pin code, proximity card, smart card, or magnetic swipe card.

10. A method, comprising:
    launching a host application on an image handling device, the image handling device including an application layer, hardware and an operating system;
    launching an activation manager, the activation manager determining which installed plug-ins and which services corresponding to the installed plug-ins to activate;
    reading a configuration file stored on the image handling device, the configuration file including information identifying the image handling device, the user of the image handing device and the services corresponding to the installed plug-ins;
    determining the activation status of each service in the configuration file;
    updating the configuration file based on the determining, the configuration file being updated to including information regarding the activation status of each service;
    generating a project array based on the number of installed plug-ins;
    generating a service array for each project;
    displaying a project array window, the project array window graphically displaying each project included in the project array;
    determining the activation status of each project selected by a user and each corresponding service, the activation status of each project and each service respectively indicating whether the respective project and the respective service has been authorized for use; and
    displaying a main window and a default service window when a project is selected in the project array window and is determined to be active, the main window including graphical indicia of the activated project services.

11. The method according to claim 10, further including:
displaying options in the corresponding service window for entry and selection when one of the graphical indicia corresponding to the activated project services is selected;
adding upload data produced by the hardware of the image handling device and options entered and selected in the service window to a job queue;
identifying activated service date handlers using the activation information in the configuration file; and
processing upload data in the job queue using the activated service data handlers, the service data handlers being services for sending the upload data from the image handling device to a destination included in a configuration file.

12. A non-transitory computer readable medium storing program code for causing an image handling device to perform a method, comprising:
launching a host application on an image handling device, the image handling device including an application layer, hardware and an operating system;
launching an activation manager, the activation manager determining which installed plug-ins and which services corresponding to the installed plug-ins to activate;
reading a configuration file stored on the image handling device, the configuration file including information identifying the image handling device, the user of the image handing device and the services corresponding to the installed plug-ins;
determining the activation status of each service in the configuration file;
updating the configuration file based on the determining, the configuration file being updated to including information regarding the activation status of each service;
generating a project array based on the number of installed plug-ins;
generating a service array for each project;
displaying a project array window, the project array window graphically displaying each project included in the project array;
determining the activation status of each project selected by a user and each corresponding service, the activation status of each project and each service respectively indicating whether the respective project and the respective service has been authorized for use; and
displaying a main window and a default service window when a project is selected in the project array window and is determined to be active, the main window including graphical indicia of the activated project services.

13. An image handling device, comprising:
a host application configured to provide the core service of the image handling device;
a plug-in application configured to be programmatically invoked by the host application;
an activation manager configured to control access to the plug-in application;
a configuration file updated by the activation manager stored in a memory and including information regarding activation status of the plug-in application and functions corresponding to the plug-in application, the host application configured to programmatically invoke the plug-in in accordance with information regarding activation status in the configuration file,
wherein the activation status of the plug-in application indicates whether the plug-in application has been authorized for use.

14. The device according to claim 13, wherein the activation manger controls access to the plug-in application by connecting to a database including activation information.

15. The device according to claim 13, wherein the information regarding activation includes a use time limit.

16. The device according to claim 13, wherein the configuration file is an XML file.

17. The device according to claim 13, wherein the information regarding activation includes a limit on the number of operations that can be performed on the image handling device.

18. The device according to claim 13, wherein the information regarding activation is remotely input into the image handling device.

19. The device according to claim 13, wherein a user of the image handling device can modify the information regarding activation by purchasing activation.

20. The device according to claim 19, wherein the user can purchase activation using an external device.

21. The device according to claim 20, wherein the external device is one of biometrics, a pin code, proximity card, smart card, or magnetic swipe card.

22. An image handling device, comprising:
a display device;
a memory configured to store a configuration file associated with a host application, the configuration file including:
an identification of at least one activated plug-in associated with the host application;
at least one project corresponding to the activated plug-in;
at least one activated service corresponding to the at least one project and including data indicating the functions of the image handling device;
an activation manager configured to determine the activation status of each plug-in and corresponding services using information regarding activation included in the configuration file, the activation status of each plug-in and each corresponding service indicates whether the plug-in and the corresponding services are authorized for use;
a controller configured to interface with the host application and activation manager to present a graphical interface including activated projects and the corresponding set of activated services,
wherein the controller displays activated project selection data enabling the user to select an activated project and displays activated service selection data, corresponding to the selected activated project, enabling the user to select an activated service.

23. A method, comprising:
launching a host application on an image handling device, the image handling device including an application layer, hardware and an operating system;
launching an activation manager, the activation manager determining which installed plug-ins and which services corresponding to the installed plug-ins to activate;
reading a configuration file stored on the image handling device, the configuration file including information identifying the image handling device, the user of the image handing device and the services corresponding to the installed plug-ins;
determining the activation status of each service in the configuration file;

updating the configuration file based on the determining, the configuration file being updated to including information regarding the activation status of each service;

generating a project array based on the number of installed plug-ins;

generating a service array for each project;

displaying a project array window, the project array window graphically displaying each project included in the project array;

determining the activation status of each project selected by a user and each corresponding service;

displaying a main window and a default service window when a project is selected in the project array window and is determined to be active, the main window including graphical indicia of the activated project services;

displaying options in the corresponding service window for entry and selection when one of the graphical indicia corresponding to the activated project services is selected;

adding upload data produced by the hardware of the image handling device and options entered and selected in the service window to a job queue;

identifying activated service date handlers using the activation information in the configuration file; and processing upload data in the job queue using the activated service data handlers, the service data handlers being services for sending the upload data from the image handling device to a destination included in a configuration file.

* * * * *